(12) United States Patent
Suzuki

(10) Patent No.: US 11,679,589 B2
(45) Date of Patent: Jun. 20, 2023

(54) INFORMATION PROCESSING SYSTEM, LEARNING DEVICE, AND INFORMATION PROCESSING METHOD

(71) Applicant: Seiko Epson Corporation, Tokyo (JP)

(72) Inventor: Kazunaga Suzuki, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 87 days.

(21) Appl. No.: 17/473,238

(22) Filed: Sep. 13, 2021

(65) Prior Publication Data

US 2022/0080733 A1 Mar. 17, 2022

(30) Foreign Application Priority Data

Sep. 16, 2020 (JP) .............................. JP2020-155296

(51) Int. Cl.
*B41J 2/165* (2006.01)
(52) U.S. Cl.
CPC ................................ *B41J 2/16517* (2013.01)
(58) Field of Classification Search
CPC .................................................. B41J 2/16517
See application file for complete search history.

(56) References Cited

U.S. PATENT DOCUMENTS

2020/0257586 A1 8/2020 Kobayashi

FOREIGN PATENT DOCUMENTS

| CN | 111562890 | 8/2020 |
| JP | 2013-078858 | 5/2013 |
| JP | 2018-136736 | 8/2018 |

OTHER PUBLICATIONS

Machine English Translation of JP2007021910A (Year: 2007).*

* cited by examiner

*Primary Examiner* — Sharon Polk
(74) *Attorney, Agent, or Firm* — Workman Nydegger

(57) ABSTRACT

An information processing system includes a storage portion that stores a learned model obtained by performing machine learning on a maintenance condition for a print head based on a data set in which ink flow path inside information indicating a state of an ink flow path of the print head, nozzle surface image information obtained by photographing a nozzle plate surface of the print head, and maintenance information of the print head are associated with each other, an acquisition portion that acquires the ink flow path inside information and the nozzle surface image information, and a processing portion that outputs the maintenance information based on the acquired ink flow path inside information, the acquired nozzle surface image information, and the learned model.

12 Claims, 17 Drawing Sheets

INFORMATION PROCESSING SYSTEM, LEARNING DEVICE, AND INFORMATION PROCESSING METHOD

The present application is based on, and claims priority from JP Application Serial Number 2020-155296, filed Sep. 16, 2020, the disclosure of which is hereby incorporated by reference herein in its entirety.

BACKGROUND

1. Technical Field

The present disclosure relates to an information processing system, a learning device, and an information processing method.

2. Related Art

In the related art, a printing device has been widely known that forms an image on a print medium by discharging ink droplets from a print head. In the print head, a discharge defect occurs due to various factors. When the discharge defect occurs, the ink droplets do not land at appropriate positions on the print medium, thereby resulting in deterioration of print quality. For example, when the printing device is a production machine used in the field of signing and textile printing, the occurrence of the discharge defect greatly influences productivity.

JP-A-2018-136736 discloses a method for predicting a part replacement time of a print head, an optimum maintenance method, and the like.

There is a possibility that a discharge defect occurs due to various factors in a print head. When performing processing related to maintenance to eliminate the discharge defects, it is desirable to use information related to the various factors in the processing. A method according to the related art, such as JP-A-2018-136736, there is not sufficient disclosure about using information related to an ink flow path or a nozzle plate surface when maintenance information is obtained.

SUMMARY

According to an aspect of the present disclosure, there is provided an information processing system including a storage portion that stores a learned model obtained by performing machine learning on a maintenance condition for a print head based on a data set in which ink flow path inside information indicating a state of an ink flow path of the print head, nozzle surface image information obtained by photographing a nozzle plate surface of the print head, and maintenance information of the print head are associated with each other; an acquisition portion that acquires the ink flow path inside information and the nozzle surface image information; and a processing portion that outputs the maintenance information based on the acquired ink flow path inside information, the acquired nozzle surface image information, and the learned model.

According to another aspect of the present disclosure, there is provided a learning device including an acquisition portion that acquires a data set in which ink flow path inside information indicating a state of an ink flow path of a print head, nozzle surface image information obtained by photographing a nozzle plate surface of the print head, and maintenance information of the print head are associated with each other; and a learning portion that generates a learned model by performing machine learning on a maintenance condition for the print head based on the data set.

According to a still another aspect of the present disclosure, there is provided an information processing method including acquiring a learned model obtained by performing machine learning on a maintenance condition for a print head based on a data set in which ink flow path inside information indicating a state of an ink flow path of the print head, nozzle surface image information obtained by photographing a nozzle plate surface of the print head, and maintenance information of the print head are associated with each other; acquiring the ink flow path inside information and the nozzle surface image information; and outputting the maintenance information based on the acquired ink flow path inside information, the acquired nozzle surface image information, and the learned model.

DESCRIPTION OF EXEMPLARY EMBODIMENTS

Hereinafter, preferred embodiments of the present disclosure will be described in detail. The present embodiment described below does not unreasonably limit contents described in the claims, and not all of the configurations described in the present embodiment are limited as essential constituent requirements.

1. Information Processing System

Figure 1:
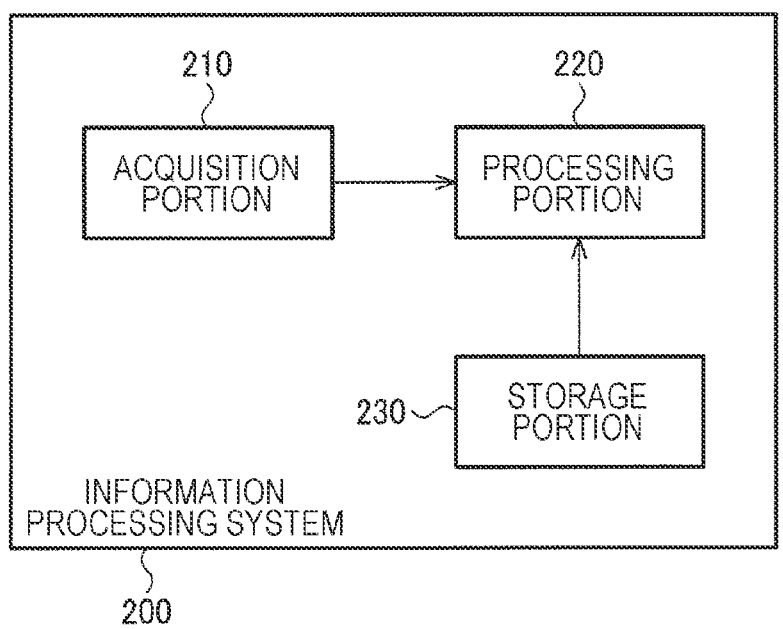
FIG. 1 is a configuration example of an information processing system.

FIG. 1 is a diagram showing a configuration example of an information processing system 200 of the present embodiment. The information processing system 200 includes an acquisition portion 210, a processing portion 220, and a storage portion 230. The storage portion 230 stores a learned model. The learned model is a model acquired by performing machine learning on maintenance conditions for a print head 30 based on a data set in which ink flow path inside information indicating a state of an ink flow path of the print head 30, nozzle surface image information obtained by photographing a nozzle plate surface of the print head 30, and maintenance information of the print head 30 are associated with each other. For example, as will be described later, the learned model is generated by a learning device 400. The learning device 400 generates the learned model based on learning ink flow path inside information which ink flow path inside information acquired in a learning stage, learning nozzle surface image information which is nozzle surface image information acquired in the learning stage, and learning maintenance information which is maintenance information acquired in the learning stage. Details of a process in the learning device 400 will be described later. Details of a printing device 1, such as the print head 30, will be described later with reference to FIG. 2 and the like.

The acquisition portion 210 acquires the ink flow path inside information in an inference stage, and the nozzle surface image information. The processing portion 220 performs a process of outputting the maintenance information based on the ink flow path inside information and the nozzle surface image information, which are acquired by the acquisition portion 210, and the learned model which is read from the storage portion 230.

The information processing system 200 of the present embodiment is a system that functions as an inference device that executes an inference process based on a generated learned model. The information processing system 200 may be provided as a system different from the printing device 1 which will be described later using FIG. 2 and the like. For example, the information processing system 200 may be a computer CP in FIG. 2, or may be a server system (not shown) connected to the computer CP via a network. Alternatively, the information processing system 200 may be included in the printing device 1. For example, the printing device 1 may include a second controller that executes a process corresponding to the information processing system 200, in addition to a controller 100 that performs print control which will be described later. Alternatively, the controller 100 which will be described later may include the information processing system 200. Further, the information processing system 200 may be realized by distributed processing of a plurality of devices.

The acquisition portion 210 may be, for example, an interface for acquiring the ink flow path inside information and the nozzle surface image information from the printing device 1, may be a processor that controls the interface, or may be both the interface and the processor. For example, when the printing device 1 is connected to the information processing system 200 via the network, the acquisition portion 210 is a communication interface for performing communication via the network, a communication control circuit, or the like.

The processing portion 220 consists of the following hardware. The hardware can include at least one of a circuit that processes a digital signal and a circuit that processes an analog signal. For example, the hardware can consist of one or more circuit devices mounted on a circuit substrate or one or more circuit elements. The one or more circuit devices are, for example, integrated circuits (IC), field-programmable gate arrays (FPGAs), and the like. The one or more circuit elements are, for example, resistors, capacitors, and the like.

Further, the processing portion 220 may be realized by the following processor. The information processing system 200 of the present embodiment includes a memory that stores information, and a processor that operates based on the information stored in the memory. Here, the memory may be the storage portion 230 or another memory. The information includes, for example, a program and various data. The processor includes the hardware. As the processor, various processors, such as a central processing unit (CPU), a graphics processing unit (GPU), and a digital signal processor (DSP), can be used. The memory may be a semiconductor memory such as a static random access memory (SRAM) or a dynamic random access memory (DRAM), may be a register, may be a magnetic storage device such as a hard disk device, and may be an optical storage device such as an optical disk device. For example, the memory stores commands that can be read by the computer, and a function of the processing portion 220 is realized as a process when the processor executes the commands. Here, the command may be a command of a command set constituting the program, or may be a command instructing an operation with respect to a hardware circuit of the processor.

The storage portion 230 stores various types of information such as the data and the program. The processing portion 220 operates, for example, using the storage portion 230 as a work area. The storage portion 230 may be a semiconductor memory such as the SRAM or the DRAM, may be the register, may be the magnetic storage device, or may be the optical storage device. The storage portion 230 stores information of the learned model as described above.

According to a method of the present embodiment, the maintenance information is output based on the ink flow path inside information and the nozzle surface image information. The ink flow path represents a path through which ink moves from an ink container to nozzles Nz. In a narrow sense, the ink flow path of the present embodiment represents an ink movement path in the print head. For example, the ink flow path of the present embodiment is a pressure chamber 331 or an ink supply path 332, which will be described later with reference to FIG. 4, but it is not hindered to include a path on a further upstream. The ink flow path inside information is information representing a state of the ink in the ink flow path. The nozzle surface image information is information representing an image acquired by imaging the nozzle plate surface on which nozzles Nz are formed. The nozzle plate surface represents a surface on a side, to which ink droplets are discharged, of a surface of a nozzle plate NP, which is a flat member, in other words, a surface on a side facing a print medium when printing is performed.

When an abnormality occurs inside the ink flow path, discharge of the ink from the nozzle Nz is hindered. When a foreign matter enters an inside of a nozzle hole, the discharge of the ink from the nozzle Nz is hindered. In addition, when the foreign matter or a liquid droplet adheres to the nozzle plate surface, there is a problem in that the ink discharged from the nozzle Nz is hindered from flying normally. That is, both the ink flow path inside information and the nozzle surface image information are information related to a factor of discharge defect. In the method of the present embodiment, it is possible to perform a process in consideration of a factor of discharge defect occurrence by using the pieces of information. Since appropriate maintenance can be executed according to the factor, it is possible to suppress a time required to eliminate the discharge defect.

Since it is possible to reduce downtime, it is possible to improve productivity in, for example, the printing device 1 which is a production machine. Further, according to the method of the present embodiment, it is possible to suppress ink consumption due to maintenance.

For example, the print head 30 of the present embodiment may be a piezo head that discharges the ink by applying a voltage to a piezoelectric element as will be described later with reference to FIG. 4. Specifically, the piezoelectric element is a piezo element PZT which will be described later. The ink flow path inside information includes waveform information of residual vibration when the voltage is applied. In this way, it is possible to estimate the state of the ink in the ink flow path based on the waveform information. For example, as will be described later with reference to FIG. 7 to FIG. 10, it is possible to detect an air bubble in the ink flow path and thickening of the ink in the ink flow path by using the waveform information.

Further, the nozzle surface image information is, for example, information which can specify at least one of foreign matter information on the nozzle plate surface, liquid droplet information on the nozzle plate surface, and foreign matter information on a nozzle hole formed on the nozzle plate surface.

The foreign matter information on the nozzle plate surface is information related to the foreign matter adhering to the nozzle plate surface, as will be described later with reference to FIG. 13, and is, for example, information on floating fluff or paper dust. The fluff is fine hair generated on a surface of the print medium. Here, the print medium is, for example, a cloth. The paper dust is a small fragment of the print medium that is paper. The liquid droplet on the nozzle plate surface is an ink droplet or a water droplet adhering to the nozzle plate surface, as will be described later with reference to FIG. 14. The ink droplets are generated, for example, when ink mist adheres to the nozzle plate surface. The mist is mist-like ink generated due to ink discharge from the nozzles Nz. The water droplet is generated by dew condensation. For example, when a temperature of the nozzle plate NP is relatively lower than an ambient temperature, the dew condensation occurs due to a temperature difference. The foreign matter in the nozzle hole represents a foreign matter that has entered the inside of the nozzle hole, as will be described later with reference to FIG. 11 and FIG. 12.

In addition, the maintenance information is information which specifies the maintenance sequence that includes at least one maintenance operation of a refreshing operation of the ink flow path, a wiping operation of the nozzle plate surface, a minute vibration operation of diffusing ink thickening, a minute suction operation of the ink from a nozzle, and a flushing operation. In this way, since it is possible to configure the maintenance sequence by appropriately combining various maintenance operations, it is possible to perform appropriate maintenance according to the factor. The maintenance sequence of the present embodiment does not hinder the execution of only any one of the above-described maintenance operations. Details of each maintenance operation will be described later.

As in the above-described JP-A-2018-136736 and the like, a method of estimating a maintenance method is known. For example, in the method according to the related art, maintenance is preferentially executed that satisfies a short time required for maintenance, low ink consumption by the maintenance, or both of them. Alternatively, in the method according to the related art, maintenance is selected based on determination of the number of defective nozzles. In the method according to the related art, it is possible to detect a discharge defect situation, such as dot omission, ink droplet flight bending, or dot thickening or thinning, but the factor of the discharge defect is not sufficiently considered. As a result, there is a problem in that, when recovery maintenance is selected, the maintenance sequence is not always obtained according to the factor of the discharge defect. On the other hand, in the method of the present embodiment, it is possible to execute appropriate maintenance by considering the factor of the discharge defect.

Further, the process executed by the information processing system 200 of the present embodiment may be realized as an information processing method. The information processing method includes acquiring the learned model, acquiring the ink flow path inside information and the nozzle surface image information, and outputting the maintenance information based on the acquired ink flow path inside information, the nozzle surface image information, and the learned model. The learned model is a learned model obtained by performing machine learning on the maintenance conditions for the print head 30 based on the data set in which the ink flow path inside information indicating the state of the ink flow path of the print head 30, the nozzle surface image information obtained by photographing the nozzle plate surface of the print head 30, and the maintenance information of the print head 30 are associated with each other.

2. Printing Device

Figure 2:
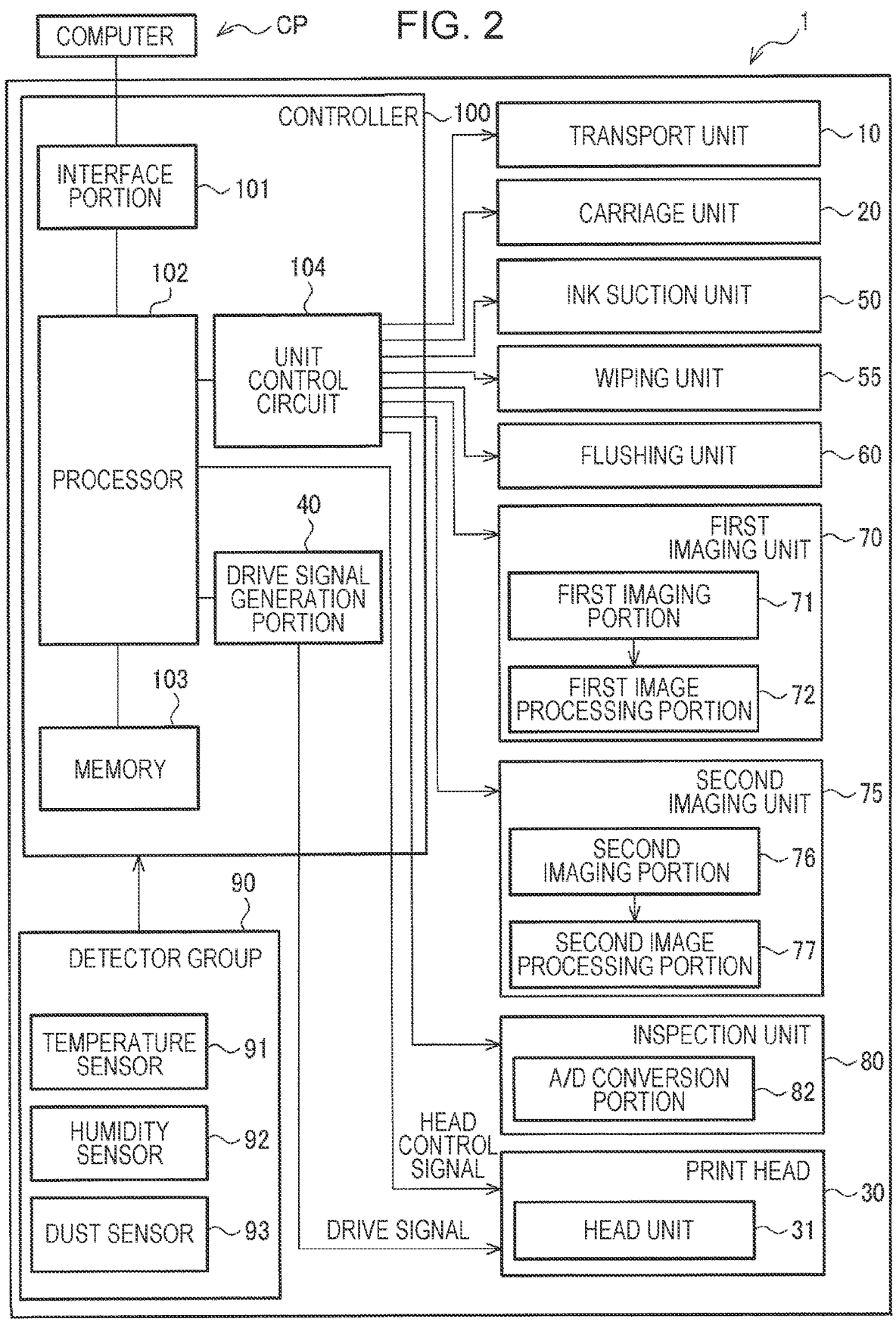
FIG. 2 is a configuration example of a printing device.

FIG. 2 is a diagram showing a configuration of the printing device 1. As shown in FIG. 2, the printing device 1 includes a transport unit 10, a carriage unit 20, a print head 30, a drive signal generation portion 40, an ink suction unit 50, a wiping unit 55, a flushing unit 60, a first imaging unit 70, a second imaging unit 75, an inspection unit 80, a detector group 90, and a controller 100. The printing device 1 discharges the ink toward the print medium and is communicatively connected to the computer CP. The computer CP transmits print data corresponding to an image to the printing device 1 in order to cause the printing device 1 to print the image.

Figure 3:
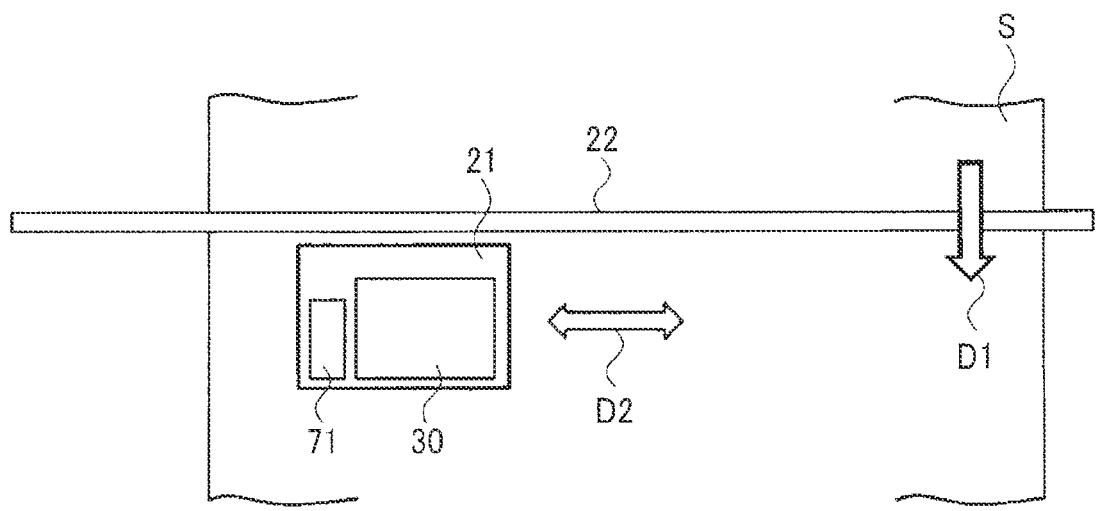
FIG. 3 is a diagram showing a configuration around a print head.

FIG. 3 is a diagram showing a configuration around the print head 30. The print medium is transported in a predetermined direction by the transport unit 10. The print medium is, for example, paper S. The paper S may be print paper of a predetermined size or may be continuous paper. The print medium is not limited to paper, and various media, such as a cloth, a film, and polyvinyl chloride (PVC), can be used. Hereinafter, the direction in which the print medium is transported is referred to as a transport direction. The transport direction corresponds to D1 in FIG. 3. The transport unit 10 includes a transport roller (not shown), a transport motor, and the like. The transport motor rotates the transport roller. The fed print medium is transported to a print area, which is an area where the printing process can be executed, through rotation of the transport roller. The print area is an area that can face the print head 30.

The print head 30 is mounted on the carriage unit 20. The carriage unit 20 includes a carriage 21 supported to be reciprocally movable along a guide rail 22 in a paper width direction of the paper S, and a carriage motor (not shown). The carriage motor is driven based on a carriage control signal from a processor 102. The carriage 21 moves integrally with the print head 30 when the carriage motor is driven. The printing device 1 of the present embodiment is, for example, a printing device using a serial head method, as shown in FIG. 3. The serial head method is a method of performing printing for a paper width by reciprocating the print head 30 in the paper width direction. The paper width direction may be represented as a main scanning direction. The paper width direction or the main scanning direction corresponds to D2 in FIG. 3.

The print head 30 includes a plurality of head units 31. Each head unit 31 includes, for example, a plurality of nozzles Nz disposed along the transport direction, and a head control portion (not shown). Hereinafter, the plurality of nozzles Nz disposed along a predetermined direction will be referred to as a nozzle row.

The drive signal generation portion 40 generates a drive signal. When the drive signal is applied to a piezo element PZT which is a drive element, the piezo element PZT expands and contracts, so that the ink is discharged from each of the nozzles Nz. Details of the head unit 31 including the piezo element PZT will be described later with reference to FIG. 4. The head control portion controls the discharge of the ink from the nozzles Nz with respect to the print medium based on a head control signal from the processor 102 and the drive signal from the drive signal generation portion 40. As a result, an image is formed on the print medium.

The ink suction unit 50 sucks the ink in the head from the nozzles Nz of the print head 30 and discharges the ink to the outside of the head. The ink suction unit 50 operates a suction pump (not shown) in a state where a cap (not shown) is in close contact with a nozzle surface of the print head 30 so as to make a space of the cap be a negative pressure, thereby sucking the ink in the print head 30 together with the air bubble mixed in the print head 30.

The wiping unit 55 removes the liquid droplet adhering to the nozzle plate NP of the print head 30. The wiping unit 55 includes a wiper capable of coming in contact with the nozzle plate NP of the print head 30. The wiper is an elastic member having flexibility. When the carriage motor is driven and the carriage 21 moves in the paper width direction, a tip portion of the wiper comes in contact with the nozzle plate NP of the print head 30 and is bent. As a result, the wiping unit 55 removes the liquid droplet adhering to the nozzle plate NP. Alternatively, the wiping unit 55 may include a mopping member, such as a cloth, and a first winding shaft and a second winding shaft around which the mopping member is wound. The mopping member wound around the first winding shaft is fed to the second winding shaft by a given feeding unit. When the mopping member is pressed against the nozzle plate NP on the path, the liquid droplet adhering to the nozzle plate NP is removed. The wiping unit 55 may be used to remove the foreign matter, such as the paper dust, adhering to the nozzle plate NP.

The flushing unit 60 receives and stores the ink discharged when the print head 30 performs a flushing operation. The flushing operation is an operation of applying a drive signal, which is not related to an image to be printed, to the drive element, and causing the ink droplets to be forcibly and continuously discharged from the nozzles Nz.

The first imaging unit 70 inspects the discharge defect based on a state of a printed image formed on the paper S. The first imaging unit 70 includes a first imaging portion 71 having a lens and an imaging element, and a first image processing portion 72 that performs a process with respect to an output signal of the imaging element. For example, the first imaging unit 70 acquires discharge result information by imaging a result in which the ink is discharged to the print medium. Although the first image processing portion 72 and the controller 100 are shown, respectively, in FIG. 2, the first image processing portion 72 may be realized by the controller 100. The first imaging unit 70 is mounted on, for example, the carriage 21 as shown in FIG. 3.

The second imaging unit 75 inspects the state of the nozzle plate surface of the print head 30. The second imaging unit 75 includes a second imaging portion 76 having a lens and an imaging element, and a second image processing portion 77 that performs a process with respect to an output signal of the imaging element. For example, the second imaging portion 76 is fixed at a given position of the printing device 1. For example, the second imaging portion 76 is disposed at a position and an angle so as to face the nozzle plate NP of the print head 30 in a state where the carriage 21 is moved to a given position which does not face the print medium. The second image processing portion 77 may be provided separately from the controller 100, or may be realized by the controller 100.

The inspection unit 80 inspects the discharge defect for each nozzle Nz based on the state of the ink in the print head 30. The inspection unit 80 includes an A/D conversion portion 82. The A/D conversion portion 82 performs A/D conversion on a detection signal in the piezo element PZT and outputs a digital signal. Here, the detection signal is the waveform information of the residual vibration. In addition, in the present embodiment, the digital signal after A/D conversion is also referred to as the waveform information of the residual vibration. Details of the waveform information of the residual vibration and a method for detecting the discharge defect based on the waveform information will be described later with reference to FIG. 7 to FIG. 10.

The controller 100 is a control unit for controlling the printing device 1. The controller 100 includes an interface portion 101, the processor 102, a memory 103, and a unit control circuit 104. The interface portion 101 transmits and receives data between the computer CP, which is an external device, and the printing device 1. The processor 102 is an arithmetic processing unit for controlling the whole printing device 1. The processor 102 is, for example, a central processing unit (CPU). The memory 103 is used to secure an area, which stores the program of the processor 102, a work area, and the like. The processor 102 controls each unit using the unit control circuit 104 according to the program stored in the memory 103.

The detector group 90 monitors an operating situation of the printing device 1, and includes, for example, a temperature sensor 91, a humidity sensor 92, and a dust sensor 93. The dust sensor 93 is, for example, a particle counter that counts the number of particles in the space. The detector group 90 may include sensors (not shown) such as a barometric pressure sensor, an altitude sensor, and a rubbing sensor. The detector group 90 may include a rotary type encoder that is used to control transport of the print media, a paper detection sensor that detects presence or absence of the print medium to be transported, and a linear type encoder for detecting a position of the carriage 21 in a movement direction.

Hereinabove, the printing device 1 using the serial head method is described above. However, the printing device 1 of the present embodiment may be a printing device using a line head method in which the print head 30 is provided to cover the paper width.

Figure 4:
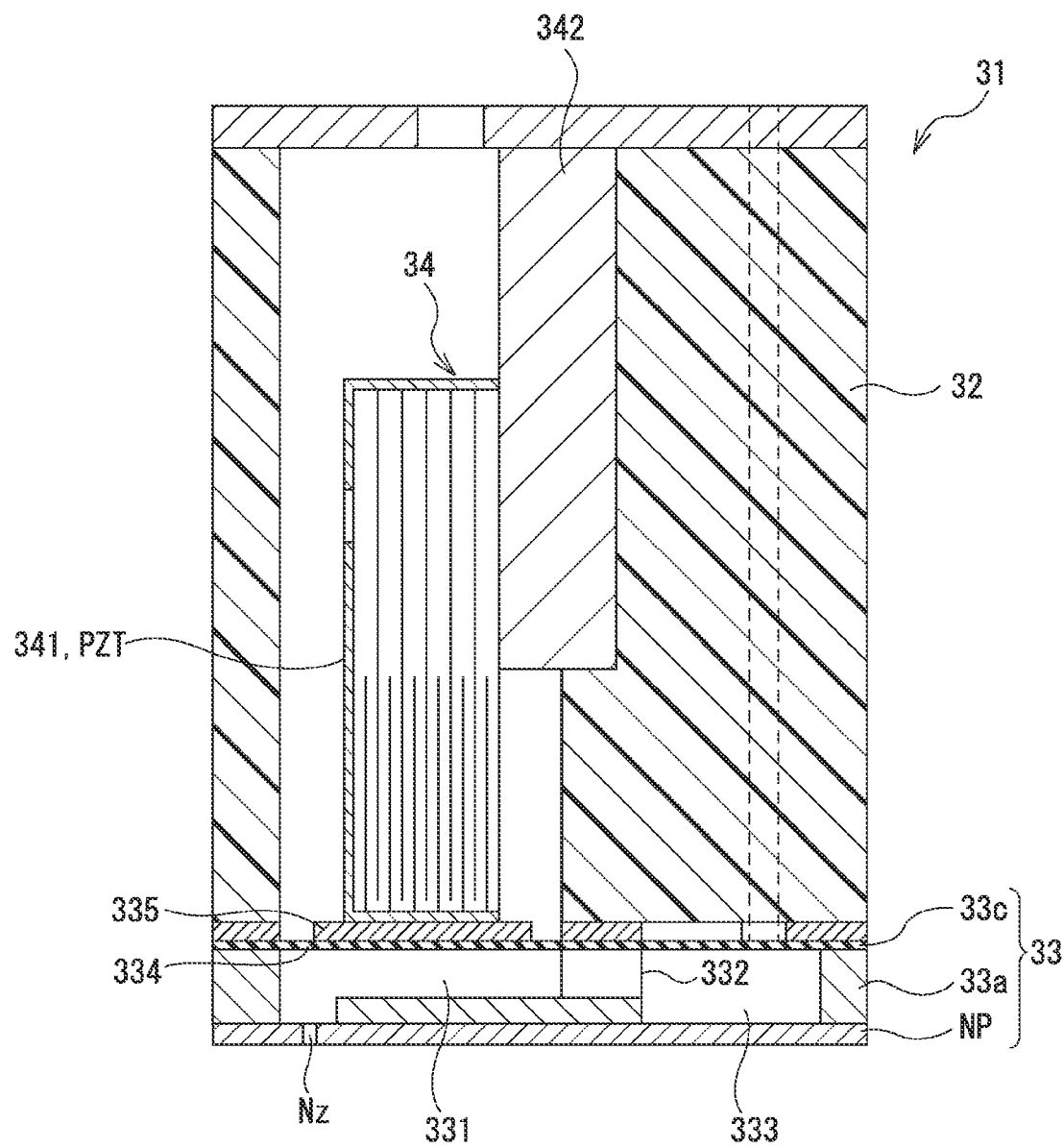
FIG. 4 is a cross-sectional diagram showing a configuration of a head unit.

FIG. 4 is a cross-sectional diagram showing a configuration of the head unit 31 included in the print head 30. The head unit 31 includes a case 32, a flow path unit 33, and a piezo element unit 34. In FIG. 4, a wiring or the like for driving the piezo element PZT is omitted.

The case 32 is a member for accommodating and fixing the piezo element PZT or the like, and is made of a non-conductive resin material such as an epoxy resin.

The flow path unit 33 includes a flow path forming substrate 33a, the nozzle plate NP, and a vibration plate 33c. The nozzle plate NP is bonded to one surface of the flow path forming substrate 33a, and the vibration plate 33c is bonded to the other surface thereof. The flow path forming substrate 33a is formed with an empty portion, which includes a pressure chamber 331, an ink supply path 332, and a common ink chamber 333, and a groove. The flow path forming substrate 33a is made of, for example, a silicon substrate. The nozzle plate NP is provided with one or more nozzle rows consisting of the plurality of nozzles Nz. The nozzle plate NP is made of a conductive plate-shaped member, for example, a thin metal plate. A diaphragm portion 334 is provided at a part, which corresponds to each pressure chamber 331, of the vibration plate 33c. The diaphragm portion 334 is deformed by the piezo element PZT to change a volume of the pressure chamber 331. The piezo element PZT and the nozzle plate NP are in an electrically insulated state by interposing the vibration plate 33c, an adhesive layer, and the like therebetween.

The piezo element unit 34 includes a piezo element group 341 and a fixing member 342. The piezo element group 341 has a comb teeth-like shape. Each comb teeth is the piezo element PZT. A tip surface of each piezo element PZT adheres to an island portion 335 of the relevant diaphragm portion 334. The fixing member 342 supports the piezo element group 341 and serves as an attachment portion with respect to the case 32. The piezo element PZT is an example of an electromechanical conversion element, and, when the drive signal is applied, the piezo element PZT expands and contracts in a longitudinal direction, thereby causing a change in pressure of liquid in the pressure chamber 331. In the ink in the pressure chamber 331, the change in pressure occurs due to a change in the volume of the pressure chamber 331. The ink droplets can be discharged from the nozzles Nz by using the change in pressure. Instead of the piezo element PZT as the electromechanical conversion element, a structure may be used in which the ink droplet is discharged by generating the air bubble according to the drive signal to be applied.

Figure 5:
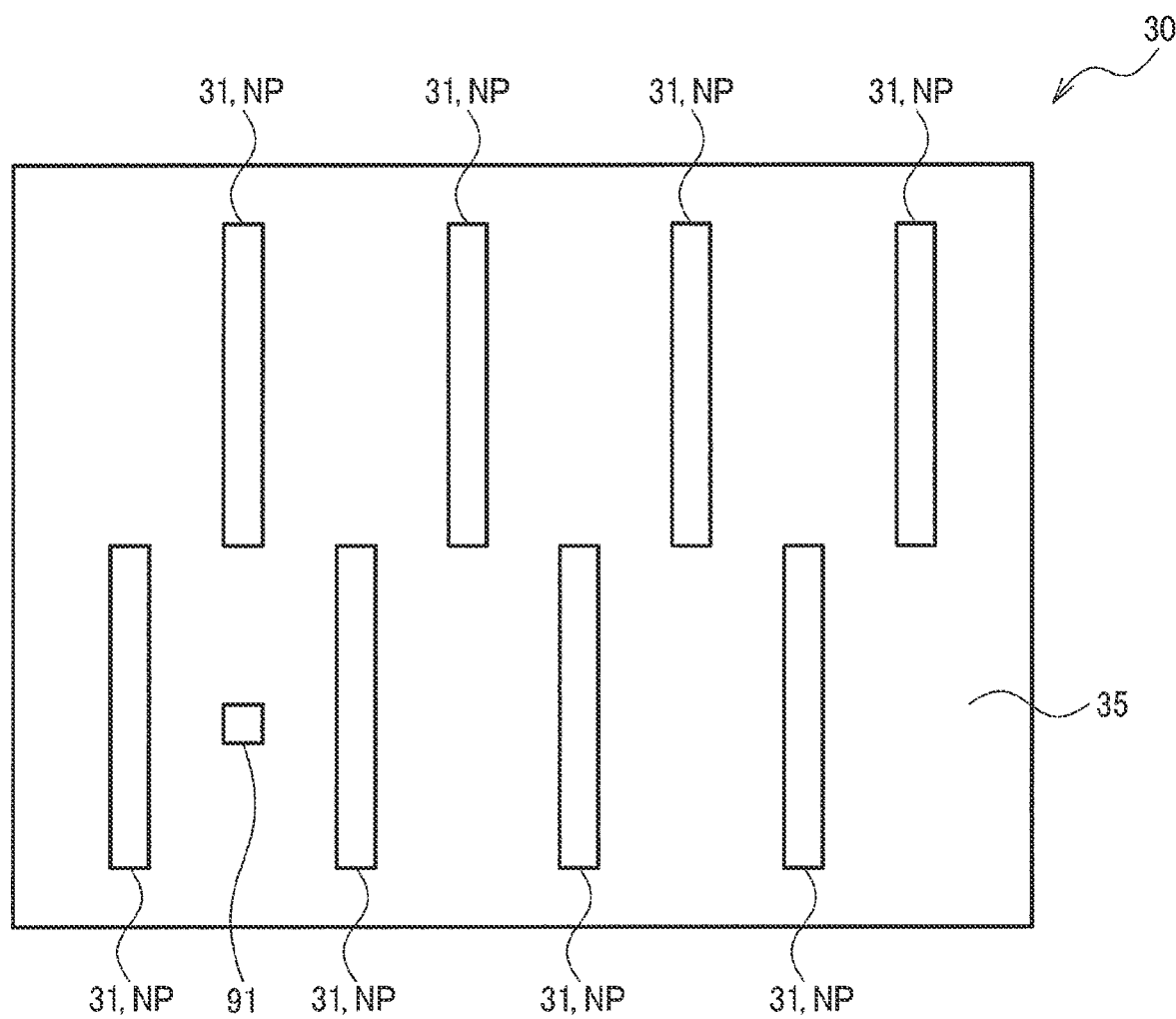
FIG. 5 is a diagram showing an example of disposition of the head unit in the print head.

FIG. 5 is a diagram showing a configuration of a surface of the print head 30 on a side from which the ink is discharged. As shown in FIG. 5, the print head 30 includes a fixing plate 35 and the plurality of head units 31 fixed to the fixing plate 35. As shown in FIG. 5, the nozzle plate NP of the head unit 31 is exposed on the surface from which the ink is discharged. As shown in FIG. 5, the temperature sensor 91 may be provided in, for example, the print head 30. In an example of FIG. 5, the temperature sensor 91 is disposed on the fixing plate 35. However, the temperature sensor 91 may be provided at another position of the printing device 1.

One head unit 31 includes, for example, one nozzle row provided along the transport direction. The print head 30 shown in FIG. 5 includes eight head units 31, that is, includes, for example, two black ink nozzle rows, two cyan ink nozzle rows, two magenta ink nozzle rows, and two yellow ink nozzle rows on a lower surface thereof. Further, the print head 30 discharges the ink of a relevant color from each nozzle row toward the paper S. However, one head unit 31 may include two or more nozzle rows. In addition, the number of head units included in the print head 30 is not limited to eight, and various modifications can be performed. In addition, the print head 30 of the present embodiment may include a nozzle row having only a specific ink color.

Further, in FIG. 3, an example in which one print head 30 is provided in the carriage 21 is described. However, two or more print heads 30 may be provided in the carriage 21. For example, when the plurality of print heads 30 are disposed at different positions in the transport direction, it is possible to increase an area which can be printed while reciprocating the carriage 21 once. In addition, various configurations are known for the print head 30 and the head unit 31, and the configurations can be widely applied in the present embodiment.

Figure 6:
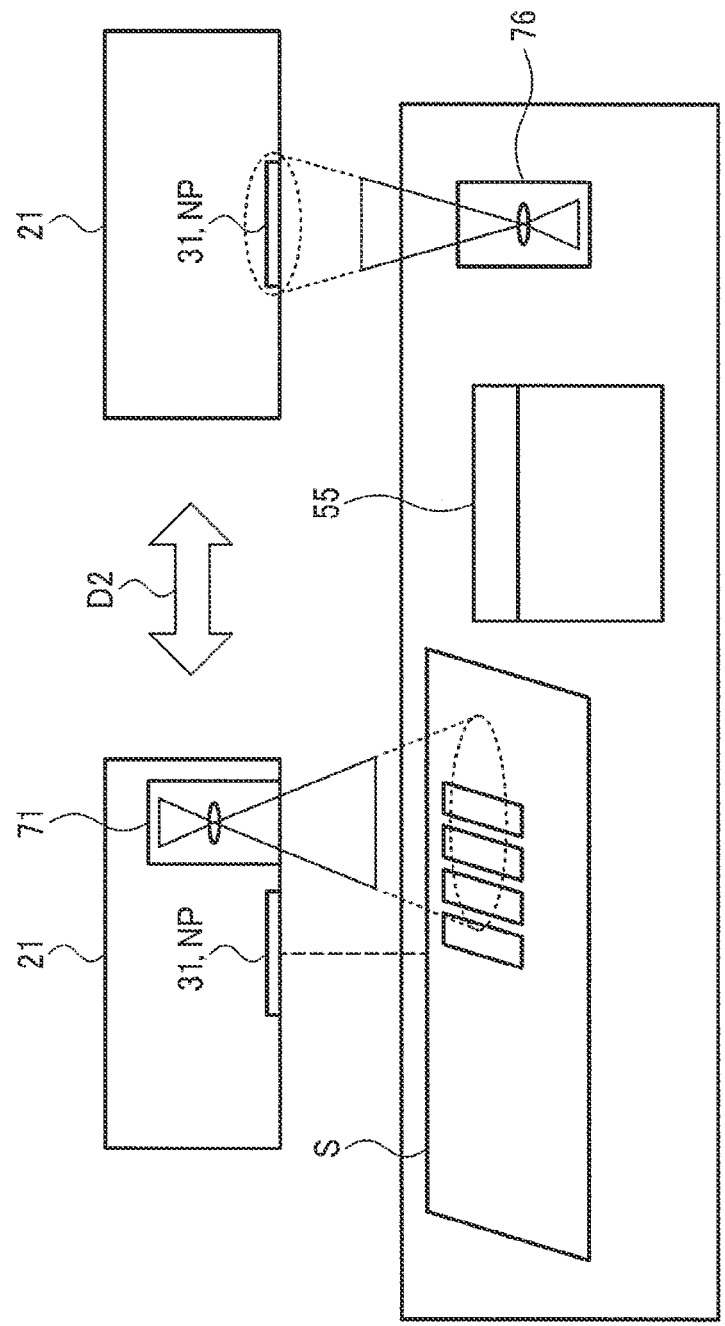
FIG. 6 is a diagram showing a positional relationship between a carriage, a first imaging portion, a second imaging portion, and a wiping unit.

FIG. 6 is a diagram schematically showing a relationship between the carriage 21, the wiping unit 55, the first imaging portion 71, and the second imaging portion 76. As described above, the carriage 21 moves along D2, which is the main scanning direction, in a state where the print head 30 and the first imaging portion 71 are mounted thereon. The wiping unit 55 and the second imaging portion 76 are provided at positions other than the carriage 21 of the printing device 1 and at positions facing the carriage when the carriage 21 moves to a given position.

As shown in FIG. 6, when the carriage 21 is moved to a position facing the print medium, the first imaging portion 71 can image a printing result. Further, when the carriage 21 moves to a position facing the wiping unit 55, the wiping unit 55 can wipe the nozzle plate NP. In addition, when the carriage 21 moves to a position facing the second imaging portion 76, the second imaging portion 76 can image a state of the nozzle plate NP.

3. Examples of Factor of Discharge Defect and Sensing Method

Various factors for ink discharge defect occurrence from the head are considered. For example, as the main factors that occur during a normal printing operation and an installation state and that can recover the state through self-maintenance, the air bubble in the ink flow path, the thickening of the ink, the foreign matter in the nozzle hole, the foreign matter or the liquid droplet on the nozzle plate surface are considered. Hereinafter, the details of each factor and the method for sensing the factor will be described.

3.1 Air Bubble or Thickening

Figure 7:
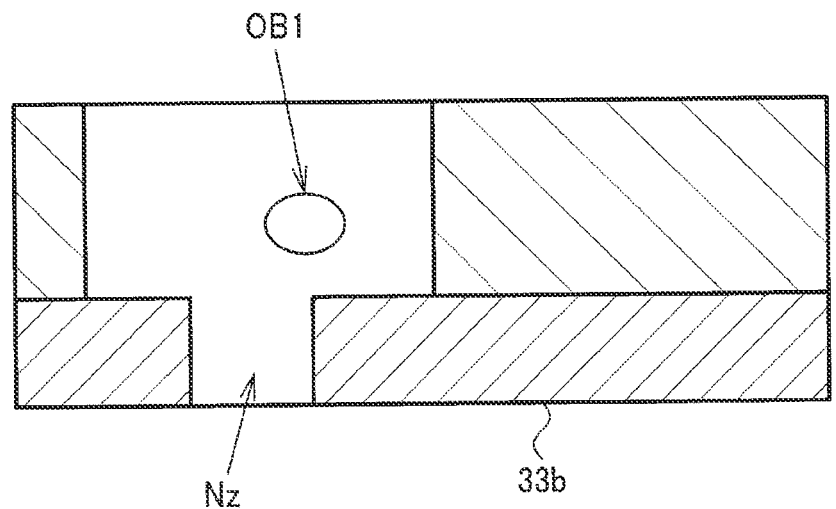
FIG. 7 is a schematic diagram showing mixing of an air bubble.
Figure 8:
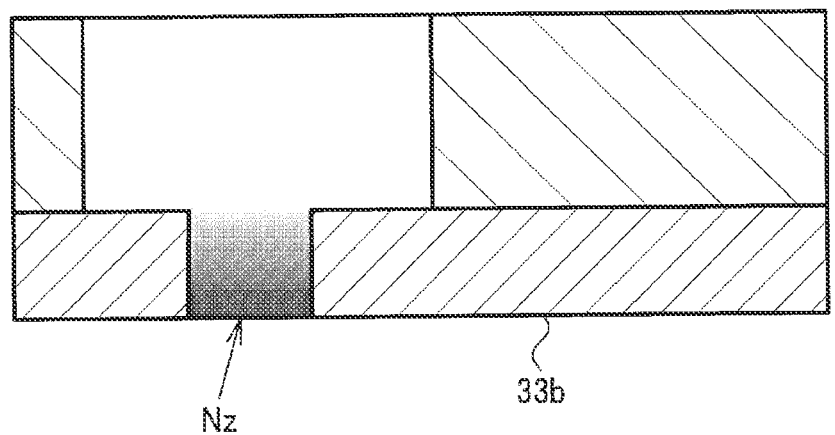
FIG. 8 is a schematic diagram showing ink thickening.

FIG. 7 and FIG. 8 are diagrams showing a factor of the discharge defect. FIG. 7 is a schematic diagram showing a state in which an air bubble is mixed inside the print head 30. In FIG. 7, OB1 is the air bubble. FIG. 8 is a schematic diagram showing a state in which the ink inside the print head 30 is thickened. The thickening represents a state in which the viscosity of ink is increased as compared with a normal state.

Both the air bubble and the thickening hinder the movement of the ink in the ink flow path. Therefore, when the air bubble and the thickening occur, the discharge defect occurs. The ink flow path inside information in the present embodiment is, for example, waveform information of the residual vibration acquired by the inspection unit 80.

Figure 9:
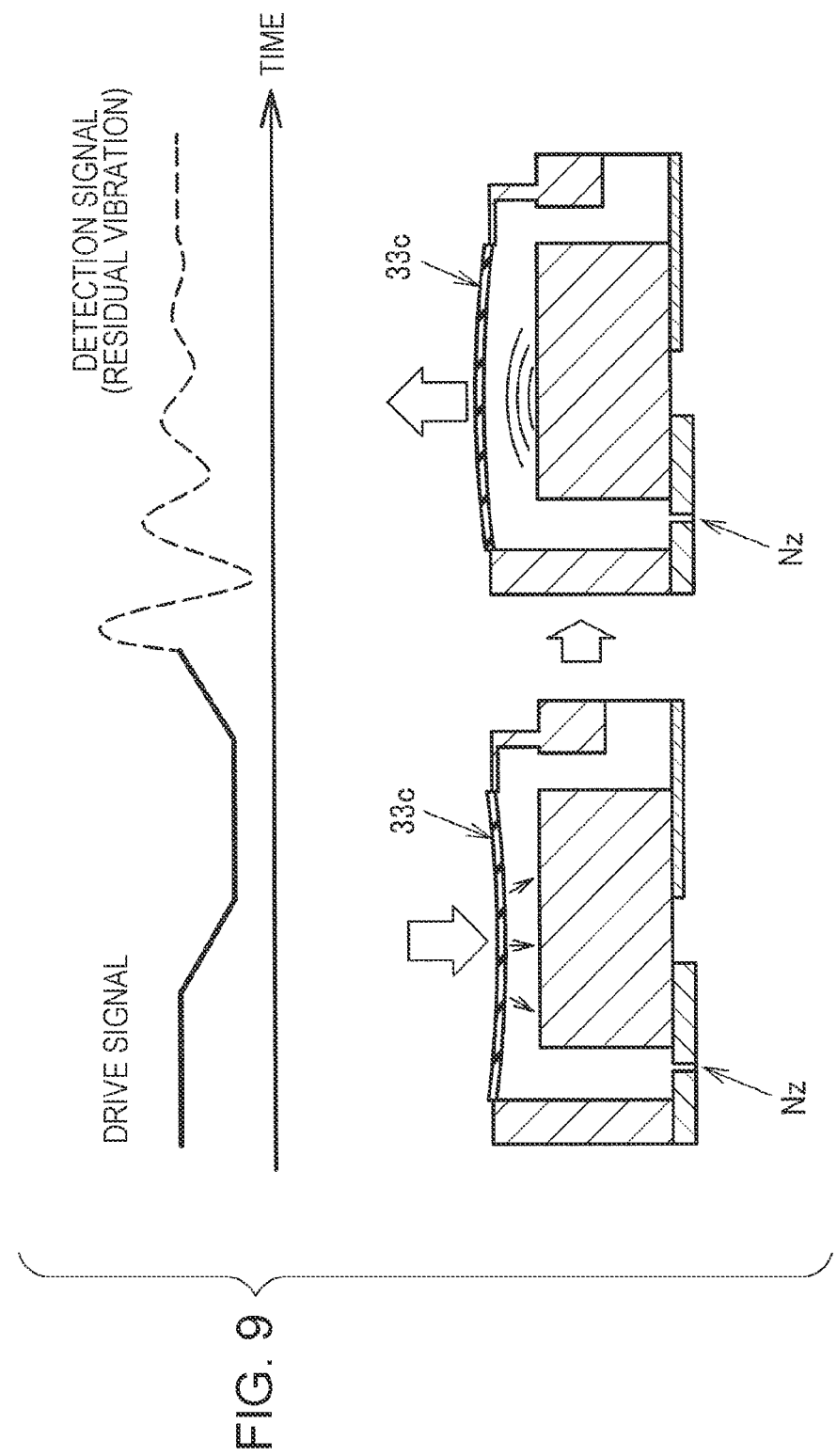
FIG. 9 is a diagram showing a method for determining a discharge defect based on waveform information of residual vibration.

FIG. 9 is a diagram showing a principle of detecting the discharge defect by the inspection unit 80. As shown in FIG. 9, when the drive signal is applied to the piezo element PZT, the piezo element PZT is bent and the vibration plate 33c vibrates. Even when the application of the drive signal to the piezo element PZT is stopped, the residual vibration is generated in the vibration plate 33c. When the vibration plate 33c vibrates due to the residual vibration, the piezo element PZT vibrates according to the residual vibration of the vibration plate 33c and outputs a signal. Therefore, when the residual vibration is generated in the vibration plate 33c and the signal generated in the piezo element PZT at that time is detected, it is possible to obtain a characteristic of each piezo element PZT. Information based on a waveform of the signal generated in the piezo element PZT due to the residual vibration is referred to as the waveform information of the residual vibration.

The detection signal according to the residual vibration of the piezo element PZT is input to the inspection unit 80. The A/D conversion portion 82 of the inspection unit 80 performs A/D conversion processing on the detection signal and outputs the waveform information which is digital data. The waveform information is stored in the memory 103. The inspection unit 80 may include a noise reduction portion (not shown) or the like. In addition, the waveform information, which is the output from the inspection unit 80, is not limited to the waveform itself, and may be information related to a period and an amplitude. In addition, the inspection unit 80 may determine presence or absence of discharge defect for each nozzle Nz based on the period and the amplitude. Here, the waveform information includes a determination result representing normality or abnormality. In this case, the inspection unit 80 includes a waveform shaping portion (not shown) and a measurement portion such as a pulse width detection portion.

Figure 10:
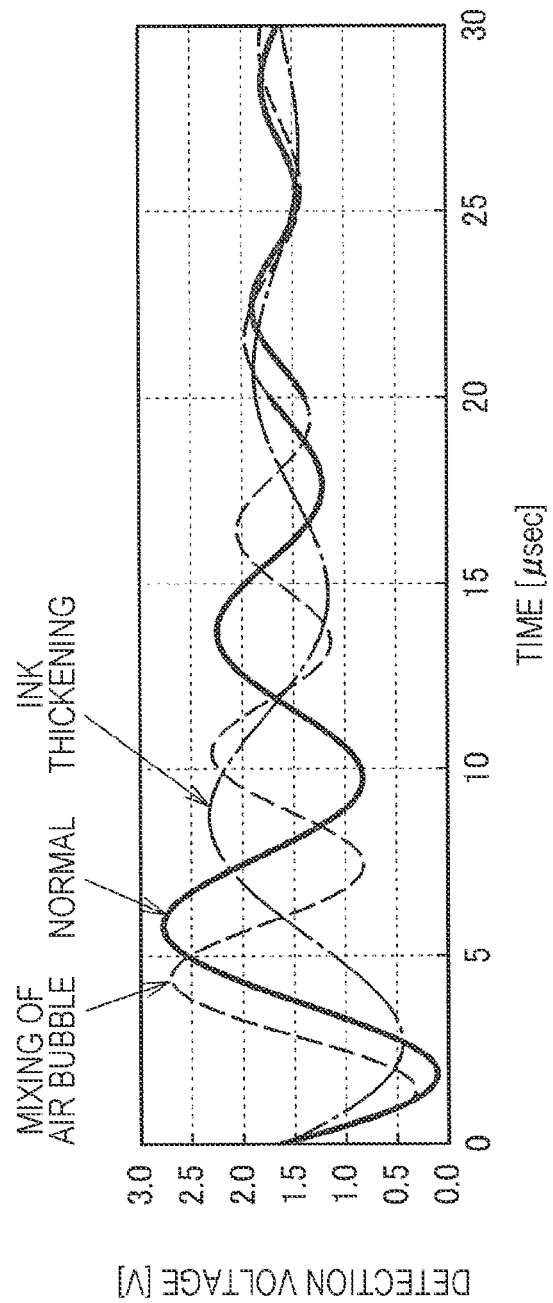
FIG. 10 is a graph showing the waveform information of residual vibration according to a state.

FIG. 10 is a diagram showing the waveform information of residual vibration according to the state of nozzle Nz. When the air bubble is mixed, as shown in FIG. 10, the waveform of the residual vibration has a short period compared with the waveform in the normal state. When the ink is thickened, the waveform of the residual vibration has a long period compared with the waveform in the normal state, as shown in FIG. 10. As described above, the waveform information of the residual vibration includes information related to abnormality, such as the air bubble and the thickening, in the ink flow path.

3.2 Foreign Matter in Nozzle Hole

Figure 11:
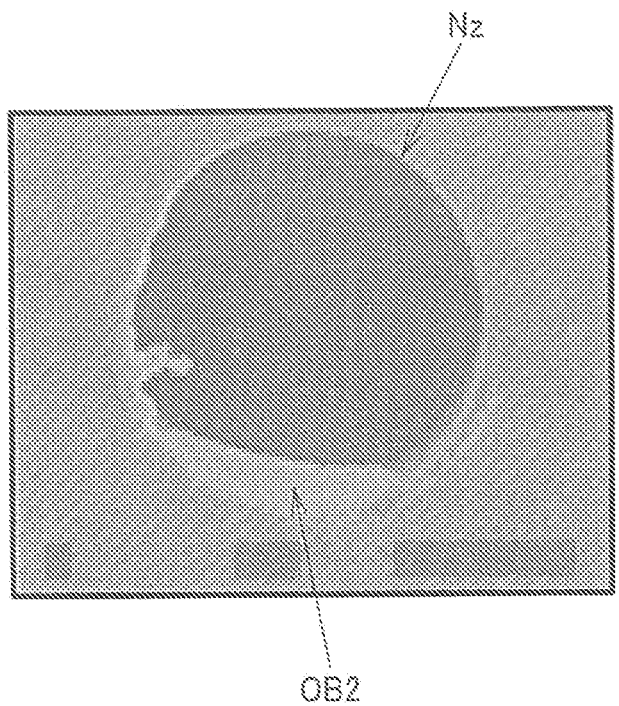
FIG. 11 is an explanatory diagram of an inserted foreign matter.
Figure 12:
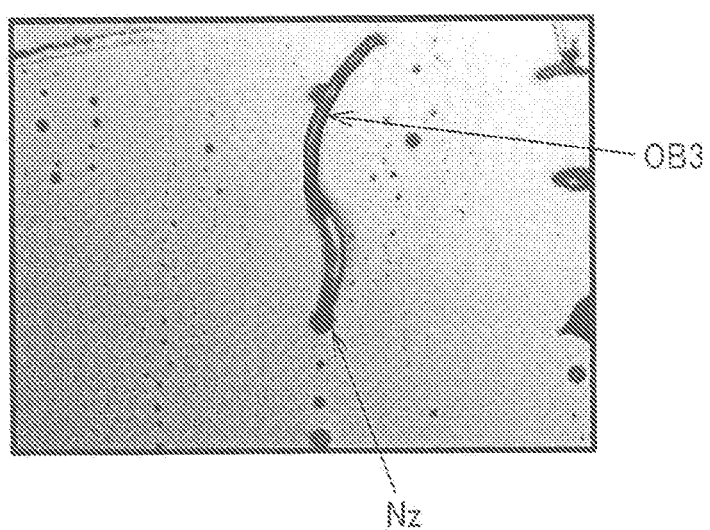
FIG. 12 is an explanatory diagram of a pierced foreign matter.

FIG. 11 and FIG. 12 are diagrams showing the foreign matter in the nozzle hole, and are examples of nozzle surface image information imaged by using, for example, the second imaging unit 75. Nz in FIG. 11 and FIG. 12 represents each nozzle hole.

OB2 shown in FIG. 11 is a foreign matter inserted inside the nozzle hole. Hereinafter, the foreign matter inserted into the nozzle hole will be referred to as inserted foreign matter OB2. The inserted foreign matter OB2 is, for example, an ink droplet that is hardened after adhering to the nozzle plate surface. As will be described later with reference to FIG. 14, there is a case where mist, which is mist-like ink, is generated by the printing operation and the mist adheres to the nozzle plate surface. When the ink droplet is thickened, the ink droplet is not sufficiently removed by the wiping operation of the wiping unit 55, and is inserted into the nozzle hole by the wiping operation.

OB3 shown in FIG. 12 is a foreign matter pierced into the nozzle hole. Hereinafter, the foreign matter pierced into the nozzle hole will be referred to as a pierced foreign matter OB3. The pierced foreign matter OB3 is, for example, fluff. The fluff is, for example, a filamentous elongated fiber, and has a thickness of approximately several tens of micrometers, which is close to a diameter of the nozzle hole to some extent, depending on a type of the fluff. Therefore, as shown in FIG. 12, there is a case in which the fluff is pierced to the nozzle hole and does not come out of the nozzle hole in normal printing or flushing.

In both cases of FIG. 11 and FIG. 12, the foreign matter is present inside the nozzle hole, so that the ink is not properly discharged from the nozzle Nz. That is, when the foreign matter is present inside the nozzle hole, the discharge defect occurs.

As shown in FIGS. 11 and 12, it is possible to detect the foreign matter in the nozzle hole based on the nozzle surface image information. For example, as shown in FIG. 11, the nozzle hole and the inserted foreign matter OB2 are imaged in a manner distinguishable in the nozzle surface image information. Specifically, the nozzle hole is imaged as an area having a color and a saturation, which are uniform and specific, in the nozzle surface image information. On the other hand, the inserted foreign matter OB2 is imaged with a color and a saturation different from those of the nozzle hole. Therefore, the image information obtained by imaging the nozzle plate surface by the second imaging portion 76 includes information related to the inserted foreign matter OB2.

In addition, as shown in FIG. 12, there is a low possibility that all of the pierced foreign matter OB3 enters the inside of the nozzle hole, and a part of the pierced foreign matter OB3 is exposed on a side of the nozzle plate surface. Further, as shown in FIG. 12, the pierced foreign matter OB3 exposed on the side of the nozzle plate surface is imaged in a manner distinguishable from the nozzle plate surface. Therefore, the image information obtained by imaging the nozzle plate surface by the second imaging portion 76 includes information related to the pierced foreign matter OB3. As the same as in FIG. 11, when the nozzle hole can be imaged with a high resolution, the normal nozzle Nz and the pierced foreign matter OB3 are displayed in different colors and saturations, so that the pierced foreign matter OB3 can be detected regardless of whether or not a part of the pierced foreign matter OB3 is exposed on the side of the nozzle plate surface. For example, the nozzle surface image information obtained by the second imaging unit 75 may include a high-resolution image for the inserted foreign matter OB2 and a low-resolution image for the adhesive foreign matter OB4 or the liquid droplet OB5, which will be described later. When performing the process in consideration of the pierced foreign matter OB3, the high-resolution image may be used or the low-resolution image may be used.

3.3 Foreign Matter or Liquid Droplet on Nozzle Plate Surface

Figure 13:
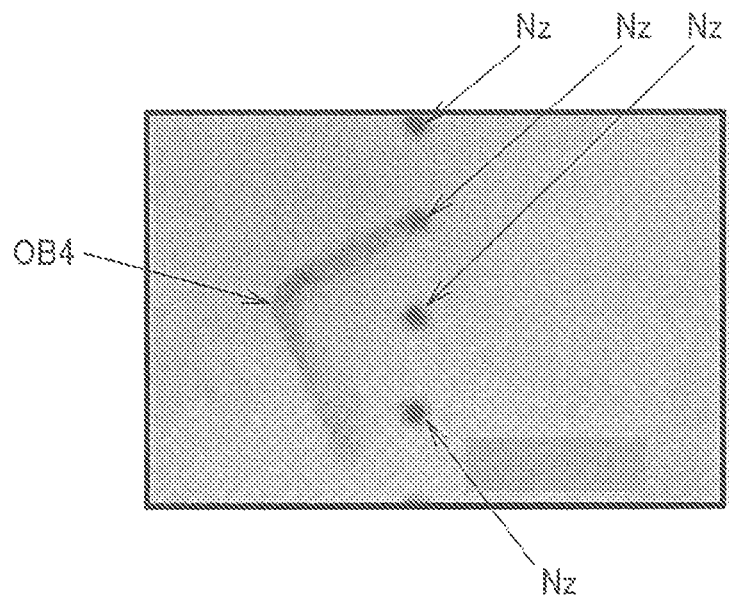
FIG. 13 is an explanatory diagram of an adhesive foreign matter.

FIG. 13 is a diagram showing the foreign matter adhering to the nozzle plate surface, and is an example of the nozzle surface image information imaged by using, for example, the second imaging unit 75. Nz in FIG. 13 represents each nozzle hole. OB4 in FIG. 13 is the foreign matter adhering to the nozzle plate surface. Hereinafter, the foreign matter adhering to the nozzle plate surface is referred to as an adhesive foreign matter OB4.

The adhesive foreign matter OB4 is, for example, the fluff or the paper dust adhering to the nozzle plate surface. For example, the adhesive foreign matter OB4 is also called the floating fluff. The adhesive foreign matter OB4 is a foreign matter that does not enter the inside of the nozzle hole, unlike the pierced foreign matter OB3 shown in FIG. 12. Therefore, even when the adhesive foreign matter OB4 is present, the ink droplet itself is normally discharged from the nozzle hole. Therefore, even when the adhesive foreign matter OB4 is present, the discharge defect does not always occur immediately.

However, when the adhesive foreign matter OB4 is positioned on a flight path of the ink droplets, the ink droplets come into contact with the adhesive foreign matter OB4 after being discharged from the nozzle hole. Since the adhesive foreign matter OB4, such as the floating fluff, is an obstacle of the flying ink droplet, the ink droplet does not normally reach the print medium even when the ink droplet is normally discharged from the nozzle hole. Further, when the adhesive foreign matter OB4 is large, there is a possibility that the ink propagates the adhesive foreign matter OB4, thereby leading to an ink dripping phenomenon.

Figure 14:
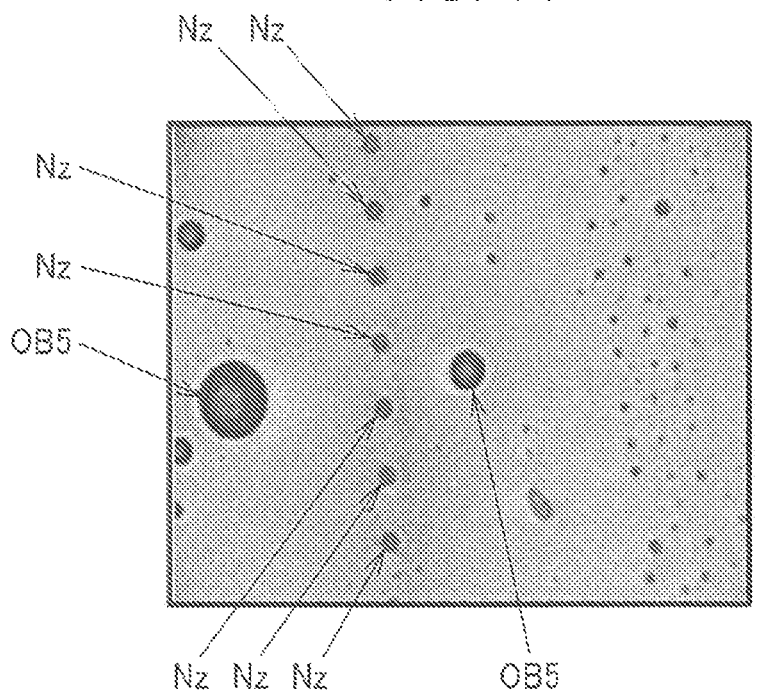
FIG. 14 is an explanatory diagram of a liquid droplet.

FIG. 14 is a diagram showing a liquid droplet OB5 adhering to the nozzle plate surface, and is an example of the nozzle surface image information imaged by using, for example, the second imaging unit 75. Nz in FIG. 14 represents each nozzle hole.

Here, the liquid droplet OB5 is, for example, the water droplet generated by the dew condensation, the ink droplet generated by mist, or both the water droplet and the ink droplet. For example, when the temperature of the nozzle plate NP is relatively lower than the ambient temperature, the dew condensation occurs due to the temperature difference. The dew condensation is more likely to occur as the temperature difference increases or as humidity inside or in a surrounding environment of the printing device 1 increases. In addition, there is a case where mist, which is mist-like ink, is generated by the printing operation and the ink droplet adheres to the nozzle plate surface due to the mist.

Even when the liquid droplet OB5 adheres to the nozzle plate surface, the liquid droplet OB5 does not directly influence the ink discharge from the nozzle hole when the liquid droplet OB5 is not present in the vicinity of the nozzle hole. However, when the liquid droplet OB5 comes into contact with a nozzle hole edge portion because a size of the liquid droplet OB5 increases with time or a position thereof changes, a meniscus of the nozzle hole is influenced so that the discharge defect is caused.

Figure 15:
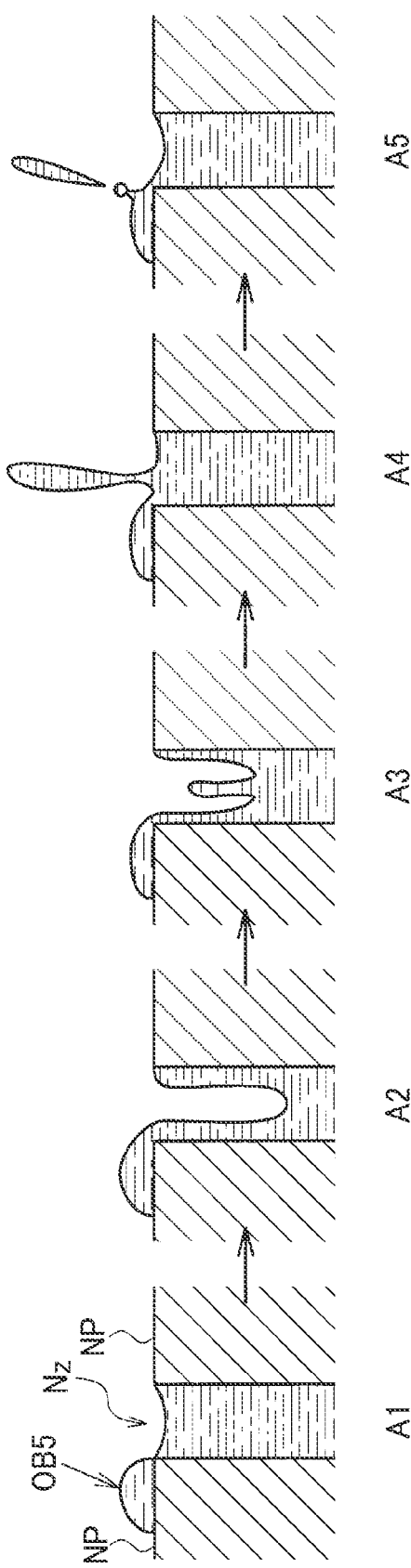
FIG. 15 is a diagram showing occurrence of flight bending due to the liquid droplet.

FIG. 15 is a diagram showing flight bending caused by the liquid droplet OB5 on the nozzle plate surface. In FIG. 15, an upward direction is an ink discharge direction. A1 in FIG. 15 is a state before the ink discharge, and, here, the liquid droplet OB5 adheres in the vicinity of the nozzle Nz. As shown in A2, when the piezo element PZT is driven, a liquid surface of the ink is drawn in a direction opposite to the discharge direction. Hereinafter, a shape of the liquid surface is referred to as meniscus. Thereafter, as shown in A3 and A4, the meniscus tries to return to an original state while the ink is discharged. However, when the liquid droplet OB5 is present in the vicinity of the nozzle Nz, the ink is pulled toward a side of the liquid droplet when the meniscus and the discharged ink are separated as shown in A5. As a result, a part of the discharged ink has a bent discharge direction and lands at a position shifted to the side of the liquid droplet, compared to an original landing position.

As shown in FIG. 13 and FIG. 14, in the nozzle surface image information, the adhesive foreign matter OB4 and the liquid droplet OB5 are imaged in a manner distinguishable from the nozzle Nz and the nozzle plate NP. Therefore, the nozzle surface image information includes information related to the adhesive foreign matter OB4 or the liquid droplet OB5.

4. Maintenance

In addition, as the maintenance operation that can be performed by the printing device 1 in order to eliminate or prevent the discharge defect, for example, the refreshing operation in the ink flow path, the wiping operation, the minute vibration operation, the minute suction operation, the flushing operation, and the like can be considered.

The refreshing operation represents an operation of applying a negative pressure or a pressurization to the ink flow path. For example, when the ink suction unit 50 performs suction from the side of the nozzle plate surface of the print head 30, the negative pressure is applied to the ink flow path. Alternatively, a printing device 1 is also known that includes a pressurization mechanism for filling the print head 30 with ink contained in an ink container such as an ink tank. In this case, the refreshing operation in the ink flow path may be performed by the pressurization of the pressurization mechanism. In addition, the refreshing operation is not limited to the simple pressurization or negative pressure, and may include a choke operation. The choke operation represents, for example, an operation of applying the negative pressure in a state where a sealing valve, which is provided in a supply system that supplies the ink to the print head 30, is closed. In this case, since the ink does not flow into the ink flow path even when the negative pressure is applied, the negative pressure can be increased as compared with a state where the sealing valve is not closed. As a result, when the negative pressure is eliminated, a flow velocity of ink becomes high, and it is considered that an effect of eliminating the discharge defect is high as compared the simple pressurization or negative pressure.

The wiping operation represents an operation of wiping the nozzle plate surface using the wiping unit 55. The wiping operation may be, for example, an operation in which a wiping material of the wiping unit 55 comes into contact with the nozzle plate NP while relatively moving in a given direction along the nozzle plate surface. Hereinafter, the wiping operation will be referred to as a mopping operation. For example, the controller 100 realizes the mopping operation by simultaneously executing the control of moving the carriage 21 along D2 which is the main scanning direction and the control of pressing the wiping material of the wiping unit 55 against the nozzle plate NP. Alternatively, the controller 100 may realize the mopping operation by controlling the wiping material, which is a winding-type cloth, to be pressed against the nozzle plate NP while winding the wiping material. Since the wiping material moves on the nozzle plate surface in the mopping operation, an effect of removing the foreign matter or the liquid droplet is great.

However, the wiping operation is not limited thereto. The wiping operation may be an operation in which the wiping material comes into contact with the nozzle plate NP while maintaining a positional relationship in a direction along the nozzle plate surface. Hereinafter, the wiping operation is referred to as a pressing operation. For example, the controller 100 realizes the pressing operation by stopping the carriage 21 at the position facing the wiping unit 55 and then pressing the wiping material of the wiping unit 55 against the nozzle plate NP. In the pressing operation, the force acting in the direction along the nozzle plate surface is suppressed as compared with the mopping operation, so that it is possible to suppress occurrence of abnormality in a normal nozzle. For example, it is possible to suppress the generation of the inserted foreign matter OB2 shown in FIG. 11.

The minute vibration operation represents an operation of minutely vibrating the ink in the print head 30. For example, the controller 100 performs the minute vibration operation by driving the piezo element PZT. The driving amount of the piezo element PZT at this time is small, for example, as compared with a case where the ink is discharged from the nozzle Nz. In this way, vibration is transmitted to the ink in the vicinity of the nozzle Nz, so that, when the ink is thickened, the thickening can be diffused.

The minute suction operation represents an operation of sucking a minute amount of ink from a side of the nozzle plate surface of the print head 30. The minute suction operation is performed by, for example, the ink suction unit 50. In the minute suction operation, the amount of ink discharged from the nozzle Nz is small as compared with the refreshing operation in the ink flow path. For example, when a minute amount of suction is performed and the nozzle plate surface is painted with the ink, it is possible to suppress the influence on the nozzle Nz due to wiping. In addition, the minute suction operation also has an effect of stabilizing ink flight by adjusting the meniscus.

The flushing operation represents an operation of discharging the ink from the nozzle Nz at a position which does not face the print medium. The ink discharge in the flushing is realized by the same operation as in the case of printing. For example, when the print head 30 is a piezo head as shown in FIG. 4, the flushing operation is executed by driving the piezo element PZT as the same as in the case of printing. Since the flushing operation involves the ink discharge, it is possible to eliminate the minute air bubble, the thickening, the foreign matter, and the like. In addition, when strong suction or the like is performed, there is a case where the ink discharge is not stable for a while. In this case, when the flushing operation is performed, it is possible to stabilize a state of the discharge of the ink.

The printing device 1 executes one or more combinations of maintenance operations, such as the refreshing operation, the wiping operation, the minute vibration operation, the minute suction operation, and the flushing operation, as the maintenance sequence.

For example, a first maintenance sequence is a sequence in which the minute suction operation and the wiping operation are executed in this order. A second maintenance sequence is a sequence in which the refreshing operation and the wiping operation are executed in this order. The refreshing operation in the second maintenance sequence is, for example, an operation of performing suction at an intensity of an intermediate degree. A third maintenance sequence is a sequence in which the refreshing operation, the minute suction operation, and the wiping operation, which are choke operations, are executed in this order. The first maintenance sequence has a small amount of ink consumption and can be executed in a short time, but has a small recovery effect. The third maintenance sequence has a large recovery effect, but has a large amount of ink consumption and requires a long time required for maintenance. The second maintenance sequence has the recovery effect, the amount of ink consumption, and the maintenance time at an intermediate degree.

As described above, a plurality of types of maintenance operations can be considered. In addition, there are also maintenance operations, such as the refreshing operation and the wiping operation, which can be realized by a plurality of aspects. Further, in the middle of the maintenance sequence, after an operation of eliminating the factor of defect occurrence, an operation of performing sensing again to check a state of the factor of the discharge defect may be performed. Various maintenance sequences can be realized depending on how many and in what order the various maintenance operations are combined.

However, a desired maintenance sequence differs depending on a specific factor of the discharge defect. A specific example will be described below.

For example, when the air bubble is generated in the ink flow path, the refreshing operation is considered to be effective. At this time, when suction time or the flow velocity is optimized according to a position and size information of the air bubble, a recovery rate or the ink consumption due to maintenance can be appropriately adjusted. In addition, when the air bubble is present only at a tip portion of the nozzle, there is a possibility that the discharge defect is recovered only by the wiping operation without performing the refreshing operation.

In addition, even when the ink is thickened, the refreshing operation is considered to be effective. At this time, when the suction time or the flow velocity is optimized according to a degree of thickening in the nozzle path or thickening distribution state information while considering that the thickening gradually permeates into the inside of the nozzle path after the thickening occurs from the ink at the tip of the nozzle, the recovery rate or the ink consumption due to maintenance can be appropriately adjusted. In addition, in a case of the thickening at a level in which the discharge is possible, it is possible to perform the discharge by only the flushing operation. In addition, in a case of thickening at the tip portion of the nozzle, the diffusion by the minute vibration operation or the discharge by the wiping operation is effective. The wiping operation at this time may be a pressing operation instead of the mopping operation. When the pressing operation is performed, it is possible to improve the factor of the discharge defect without damaging a normal nozzle and without wastefully consuming the ink.

Further, when the refreshing operation is simply performed, root causes of the inserted foreign matter OB2 shown in FIG. 11 and the pierced foreign matter OB3 shown in FIG. 12 cannot be eliminated, so that maintenance ink and time are wastefully consumed.

For example, the inserted foreign matter OB2 can be peeled off from a nozzle edge by applying high frequency vibration to the ink in the print head 30. For example, since the piezo element PZT is driven at a high frequency as compared with a normal printing operation, it is possible to apply high frequency vibration to the ink. In that case, it is effective to fill the cap that closes the nozzle plate NP with the ink in order to firmly transmit the vibration to the inserted foreign matter OB2. Here, the cap is included in, for example, the ink suction unit 50. In addition, in order to prevent the ink in the cap from flowing back to the nozzle Nz due to the high frequency vibration, it is desirable to apply the high frequency vibration while performing the minute suction operation.

It is difficult to eliminate the pierced foreign matter OB3 only by the refreshing operation, and it is necessary to scrape off the pierced foreign matter OB3 with the wiping operation before the refreshing operation. In that case, it is desirable to perform the minute suction operation in advance to wet the nozzle plate surface so that the water-repellent film on the nozzle plate surface does not deteriorate when the wiping operation becomes a pawing the air.

In addition, a strong maintenance operation used for eliminating the foreign matter as described above causes the normal nozzle Nz to temporarily be in a defective state, so that a maintenance operation of adjusting the whole is required at the end. Therefore, the flushing operation or the like may be added to the maintenance sequence.

In addition, with respect to the adhesive foreign matter OB4 or the liquid droplet OB5 shown in FIG. 13, the ink discharge itself from the nozzle Nz is normal, so that it is effective to eliminate the foreign matter on the nozzle plate surface by performing the wiping operation instead of the refreshing operation. In addition, since it is easy to eliminate the foreign matter as compared with the defective factor, such as the inserted foreign matter OB2 or the pierced foreign matter OB3, not the mopping operation but the pressing operation is effective in the wiping operation.

As described above, the desirable maintenance sequence differs according to the factor of the discharge defect. In addition, even in a case of the same factor, there is a possibility that the desirable maintenance sequence differs when the specific situation differs. Furthermore, the maintenance sequence for each factor described above is an example, and a case is considered where a different maintenance sequence is effective in eliminating the discharge defect. Therefore, the information processing system 200 of the present embodiment selects an appropriate maintenance sequence by using machine learning. Hereinafter, a learning process of generating the learned model and an inference process using the generated learned model will be specifically described.

5. Learning Process

Figure 16:
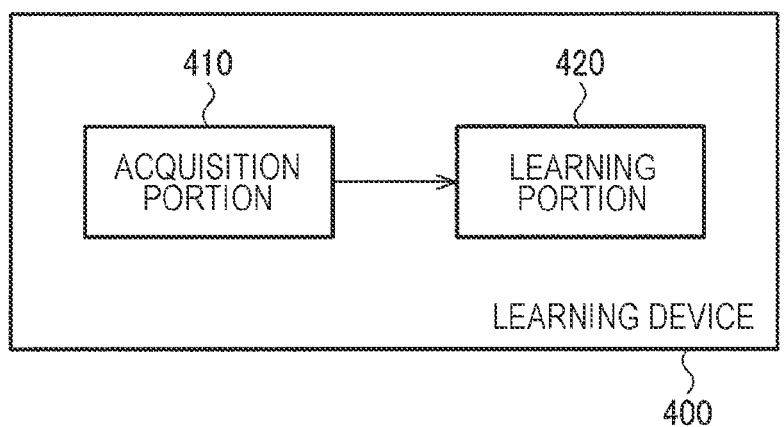
FIG. 16 is a configuration example of a learning device.

FIG. 16 is a diagram showing a configuration example of the learning device 400. The learning device 400 includes an acquisition portion 410 that acquires training data used for learning, and a learning portion 420 that performs the machine learning based on the training data.

The acquisition portion 410 is a communication interface for acquiring, for example, the training data from another device. Alternatively, the acquisition portion 410 may acquire the training data held by the learning device 400. For example, the learning device 400 includes a storage portion (not shown), and the acquisition portion 410 is an interface for reading the training data from the storage portion. The learning in the present embodiment is, for example, supervised learning. The training data in the supervised learning is a data set in which input data and a correct answer label are associated with each other.

The learning portion 420 performs the machine learning based on the training data acquired by the acquisition portion 410, and generates the learned model. The learning portion 420 of the present embodiment includes the following hardware. The hardware can include at least one of the circuit that processes the digital signal and the circuit that processes the analog signal. For example, the hardware can consist of one or more circuit devices mounted on the circuit substrate or one or more circuit elements.

Further, the learning portion 420 may be realized by a processor including the hardware. The learning device 400 includes a memory that stores information and a processor that operates based on information stored in the memory. The information includes, for example, a program and various data. It is possible to use various processors, such as a CPU, a GPU, and a DSP, as the processor. The memory may be a semiconductor memory, may be a register, may be a magnetic storage device, or may be an optical storage device. For example, the memory stores commands that can be read by the computer, and, when the commands are executed by the processor, the functions of respective portions of the learning device 400 are realized as processes. For example, the memory stores a program that defines a learning algorithm, and the processor executes the learning process by performing an operation according to the learning algorithm.

More specifically, the acquisition portion 410 acquires the data set in which the ink flow path inside information indicating the state of the ink flow path of the print head 30, the nozzle surface image information obtained by photographing the nozzle plate surface of the print head 30, and the maintenance information of the print head 30 are associated with each other. Specifically, the information acquired here is the learning ink flow path inside information, the learning nozzle surface image information, and the learning maintenance information which are used for machine learning. The learning portion 420 generates the learned model by performing machine learning on the maintenance condition for the print head 30 based on the data set.

According to the method of the present embodiment, machine learning is performed using the ink flow path inside information and the nozzle surface image information which are related to the factor of the discharge defect occurrence. When a result of the machine learning is used, it is possible to execute appropriate maintenance according to the factor.

The learning device 400 shown in FIG. 16 may be included in, for example, the printing device 1 shown in FIG. 2. In this case, the learning portion 420 corresponds to the controller 100 of the printing device 1. More specifically, the learning portion 420 may be the processor 102. The printing device 1 accumulates the ink flow path inside information, the nozzle surface image information, and the maintenance information in the memory 103. The acquisition portion 410 may be an interface that reads the information accumulated in the memory 103. In addition, the printing device 1 may transmit the accumulated information to external equipment such as the computer CP or the server system. The acquisition portion 410 may be the interface portion 101 that receives the training data necessary for the learning from the external equipment.

Further, the learning device 400 may be included in equipment different from the printing device 1. For example, the learning device 400 may be included in an external equipment connected to the printing device 1 via the network. Here, the network may be a private network such as an intranet, or may be a public communication network such as the Internet. The network may be wired or wireless. For example, the learning device 400 may be included in the information processing system 200.

Figure 17:
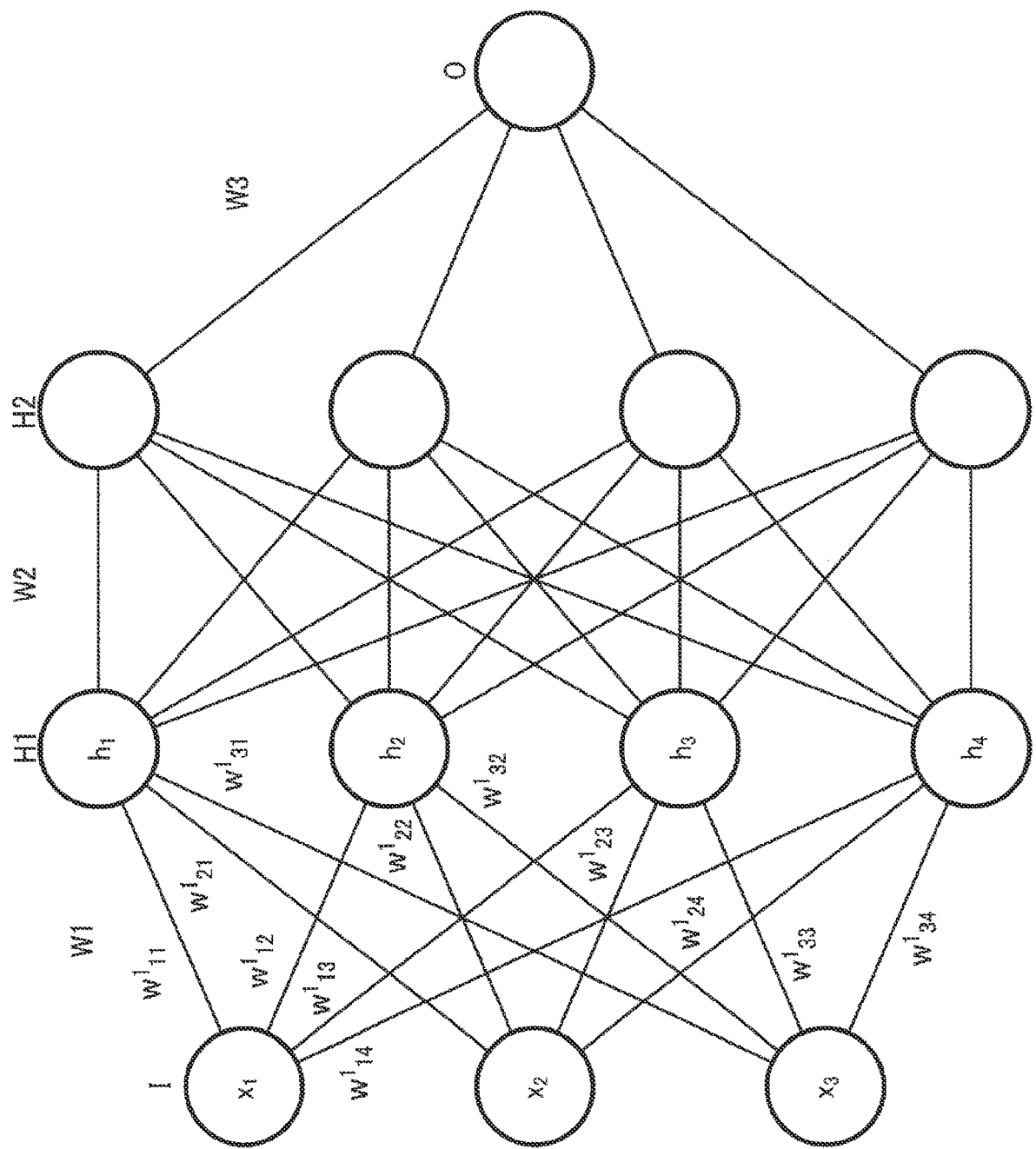
FIG. 17 is an example of a neural network.

As a specific example of the machine learning, the machine learning using a neural network will be described. FIG. 17 is an example of a basic structure of the neural network. The neural network is a mathematical model that simulates a brain function on a computer. One circle in FIG. 17 is called a node or a neuron. In the example of FIG. 17, the neural network includes an input layer, two intermediate layers, and an output layer. The input layer is I, the intermediate layers are H1 and H2, and the output layer is O. However, various modifications can be performed on the number of layers of the intermediate layers and the number of nodes included in each layer. Each of the nodes included in the input layer is combined with nodes of H1 which is a first intermediate layer. Each of the nodes included in the first intermediate layer is combined with nodes of H2 which is a second intermediate layer, and each of the nodes included in the second intermediate layer is combined with a node of the output layer. The intermediate layer may be rephrased as a hidden layer.

The input layer includes nodes that output input values, respectively. In the example of FIG. 17, the neural network receives $x_1$, $x_2$, and $x_3$ as inputs, and the respective nodes in the input layer output $x_1$, $x_2$, and $x_3$, respectively. Any preprocessing may be performed on the input values, and the respective nodes in the input layer may output values obtained after the preprocessing.

In the neural network, a weight W is set between the nodes. W1 in FIG. 17 is a weight between the input layer and the first intermediate layer. W1 represents a set of weights between a given node included in the input layer and a given node included in the first intermediate layer. When a weight between a p-th node in the input layer and a q-th node in the first intermediate layer is expressed as $w^1_{pq}$, W1 in FIG. 17 is information including 12 weights of $w^1_{11}$ to $w^1_{34}$.

In each of the nodes in the first intermediate layer, a calculation is performed of obtaining a product sum of an output and a weight of each node, which is connected to the relevant node, in an immediately before layer and further adding a bias thereto. Further, an activation function f, which is a non-linear function, is used for the calculation at each node. As the activation function f, for example, a ReLU function is used. The ReLU function becomes 0 when a variable is 0 or less and becomes a value of the variable itself when the variable is larger than 0. However, it is known that various functions can be used as the activation function f, that is, a sigmoid function may be used or a function obtained by improving the ReLU function may be used.

In addition, the same applies to subsequent layers. For example, when a weight between the first intermediate layer and the second intermediate layer is set to W2, a product sum calculation is performed using the outputs of the first intermediate layer and the weight W2, the bias is added, and a calculation of applying the activation function is performed on the nodes in the second intermediate layer. At the node in the output layer, a calculation is performed of weighting and adding the outputs of the immediately before layer and adding the bias. In the example of FIG. 17, the layer immediately before the output layer is the second intermediate layer. The neural network uses a result of the calculation in the output layer as an output of the neural network.

As can be seen from the above description, it is necessary to set an appropriate weight and bias in order to obtain a desired output from inputs. Hereinafter, the weight is also referred to as a weighting coefficient. Further, the weighting coefficient may include the bias. In the learning, a data set is prepared in which a given input x and a correct output at the input are associated with each other. The correct output is the correct answer label. The learning process of the neural network can be considered as a process of obtaining the most probable weighting coefficient based on the data set. In the learning process of the neural network, various learning methods, such as a backpropagation method, are known. In the present embodiment, since the learning methods can be widely applied, detailed description thereof will be omitted. The learning algorithm when the neural network is used is an algorithm using both a process of acquiring a forward result by performing a calculation, such as the product sum calculation described above, and a process of updating weighting coefficient information using the backpropagation method.

In addition, the neural network is not limited to the configuration shown in FIG. 17. For example, in the learning process of the present embodiment and the inference process which will be described later, a widely-known convolutional neural network (CNN) may be used. The CNN includes a convolution layer and a pooling layer. In the convolution layer, a convolution calculation is performed. Here, specifically, the convolution calculation is a filtering process. In the pooling layer, a process of reducing vertical and horizontal sizes of data is performed. When the learning process is performed using the backpropagation method or the like in the CNN, a filter characteristic used for the convolution calculation is learned. That is, the weighting coefficient in the neural network includes the filter characteristic in the CNN. In addition, various models, such as a recurrent neural network (RNN), are known as the neural network, and the various models can be widely applied in the present embodiment.

Hereinabove, an example in which the learned model is a model using the neural network is described. However, the machine learning in the present embodiment is not limited to a method using the neural network. For example, it is possible to apply machine learning using various well-known methods, such as a support vector machine (SVM), or machine learning using a method developed from the various methods to the method of the present embodiment.

Figure 18:
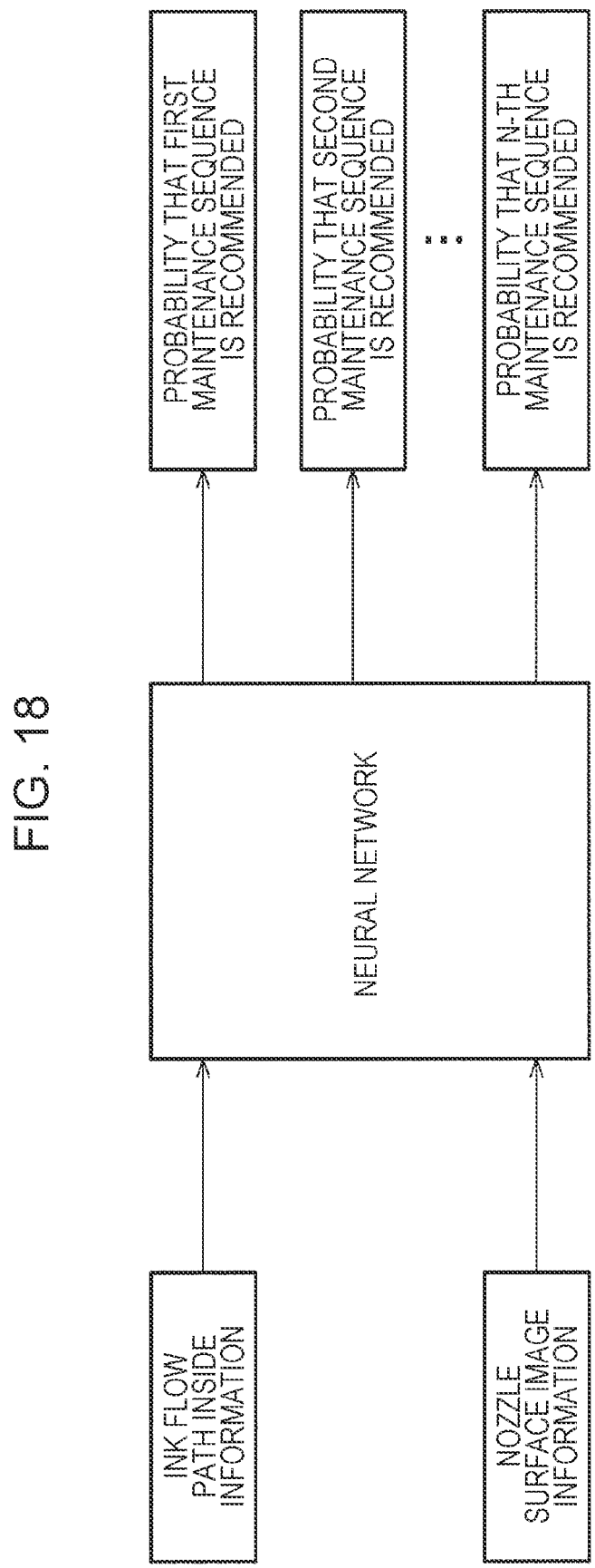
FIG. 18 is an example of input and output of the neural network.

FIG. 18 is a diagram showing input and output of the neural network. The neural network receives the ink flow path inside information and the nozzle surface image information as input, and outputs the maintenance information as output data. As described above, the ink flow path inside information is, for example, the waveform information of residual vibration. The nozzle surface image information is image information imaged by the second imaging unit 75. The maintenance information is, for example, information which specifies any one of N types of maintenance sequences that can be executed by the printing device 1. N is an integer of 2 or more. As described above, the N types of maintenance sequences are one or two or more combinations of the maintenance operations such as the refreshing operation, the wiping operation, the minute vibration operation, the minute suction operation, and the flushing operation. When the output layer of the neural network is a widely known softmax layer, the maintenance information is probability data in which a total value of N outputs is 1.

For example, in the learning stage, the ink flow path inside information and the nozzle surface image information are accumulated while operating the printing device 1. Further, when the discharge defect occurs in the printing device 1, any one of the N types of maintenance sequences are executed. The occurrence of the discharge defect may be automatically determined based on the discharge result information imaged by the first imaging unit 70, or may be manually determined by the user visually recognizing a printing result.

Further, it is determined whether or not the discharge defect is appropriately eliminated and whether or not the factor of the discharge defect is appropriately eliminated by the performed maintenance sequence. For example, in the printing device 1 at the learning stage, at least one of improvement state information of the factor of the discharge defect after maintenance and print stability information after maintenance is collected.

The improvement state information represents the states of the air bubble, the thickening, the foreign matter on the nozzle plate surface, the liquid droplet, and the foreign matter in the nozzle hole. Specifically, when the number and the size of air bubbles decrease, it is determined that the factor of the discharge defect is improved. Alternatively, when the thickening of the ink is eliminated or diffused, it is determined that the factor of the discharge defect is improved. The improvement state information related to the air bubble or the thickening is acquired, for example, by comparing the waveform information before and after the execution of the maintenance sequence.

In addition, when the inserted foreign matter OB2 in the nozzle hole or the pierced foreign matter OB3 disappears, it is determined that the factor of the discharge defect is improved. In addition, when a degree of influence on the nozzle Nz by the adhesive foreign matter OB4 or the liquid droplet OB5 on the nozzle plate surface decreases, it is determined that the factor of the discharge defect is improved. For example, the degree of influence on the nozzle Nz by the adhesive foreign matter OB4 or the liquid droplet OB5 is determined to be smaller as the number is smaller, the size is smaller, and the distance from the nozzle Nz is longer. The improvement state information related to the inserted foreign matter OB2, the pierced foreign matter OB3, the adhesive foreign matter OB4, and the liquid droplet OB5 is acquired, for example, by comparing the pieces of nozzle surface image information which are acquired before and after the execution of the maintenance sequence.

Further, the print stability information is, for example, information representing a print amount and an elapsed time until the next discharge defect occurs after the discharge defect is eliminated by the execution of the maintenance sequence. It is considered that the larger the print amount or the longer the elapsed time, the more appropriately the factor of the discharge defect is removed by the executed maintenance sequence.

For example, it is assumed that the discharge defect is eliminated and the factor of the discharge defect is appropriately eliminated by executing the maintenance sequence. The discharge defect is eliminated in a case where it is determined that the discharge defect does not occur based on the discharge result information acquired after maintenance. The factor of the discharge defect is appropriately eliminated in a case where it is determined that the factor of the discharge defect is improved based on the improvement state information, in a case where it is determined that printing corresponding to a predetermined value or more is performed until the next discharge defect occurs based on the print stability information, or both the cases.

In this case, the learning device 400 acquires, as training data, a data set in which the ink flow path inside information and the nozzle surface image information, which are obtained when the discharge defect occurs, are associated with the maintenance information which specifies the executed maintenance sequence. For example, when an i-th maintenance sequence is executed in the first maintenance sequence to the N-th maintenance sequence, it is assumed that the discharge defect is eliminated and the factor of the discharge defect is appropriately eliminated. i is an integer of 1 or more and N or less. In this case, the maintenance information is, for example, a set of N numerical values in which, for example, a value corresponding to the i-th maintenance sequence is 1 and values corresponding to the first to (i−1)-th maintenance sequences and (i+1)-th to N-th maintenance sequences are 0. When the training data is used, it is possible to perform learning so that the i-th maintenance sequence is likely to be selected when the discharge defect is detected in the same ink flow path inside information and nozzle surface image information.

Further, when the i-th maintenance sequence is executed but the discharge defect is not eliminated or when the discharge defect is eliminated but the factor of the discharge defect is not properly removed, the learning device 400 may perform the learning so that the i-th maintenance sequence is hardly selected. In this case, the maintenance information includes, for example, a set of N numerical values in which a value corresponding to the i-th maintenance sequence is 0 and values corresponding to the first to (i−1)-th maintenance sequences and (i+1)-th to N-th maintenance sequences are uniform.

In addition, a value of the correct answer data corresponding to the i-th maintenance sequence is not limited to 0 or 1, and an intermediate value between 0 and 1 may be set according to the improvement state information and the print stability information.

As described above, in the learning stage, in various situations, a data set in which the ink flow path inside information, the nozzle surface image information, and the maintenance information are associated with each other is acquired as the training data. The maintenance information is information representing whether or not to recommend each of the N types of maintenance sequences as described above.

Figure 19:
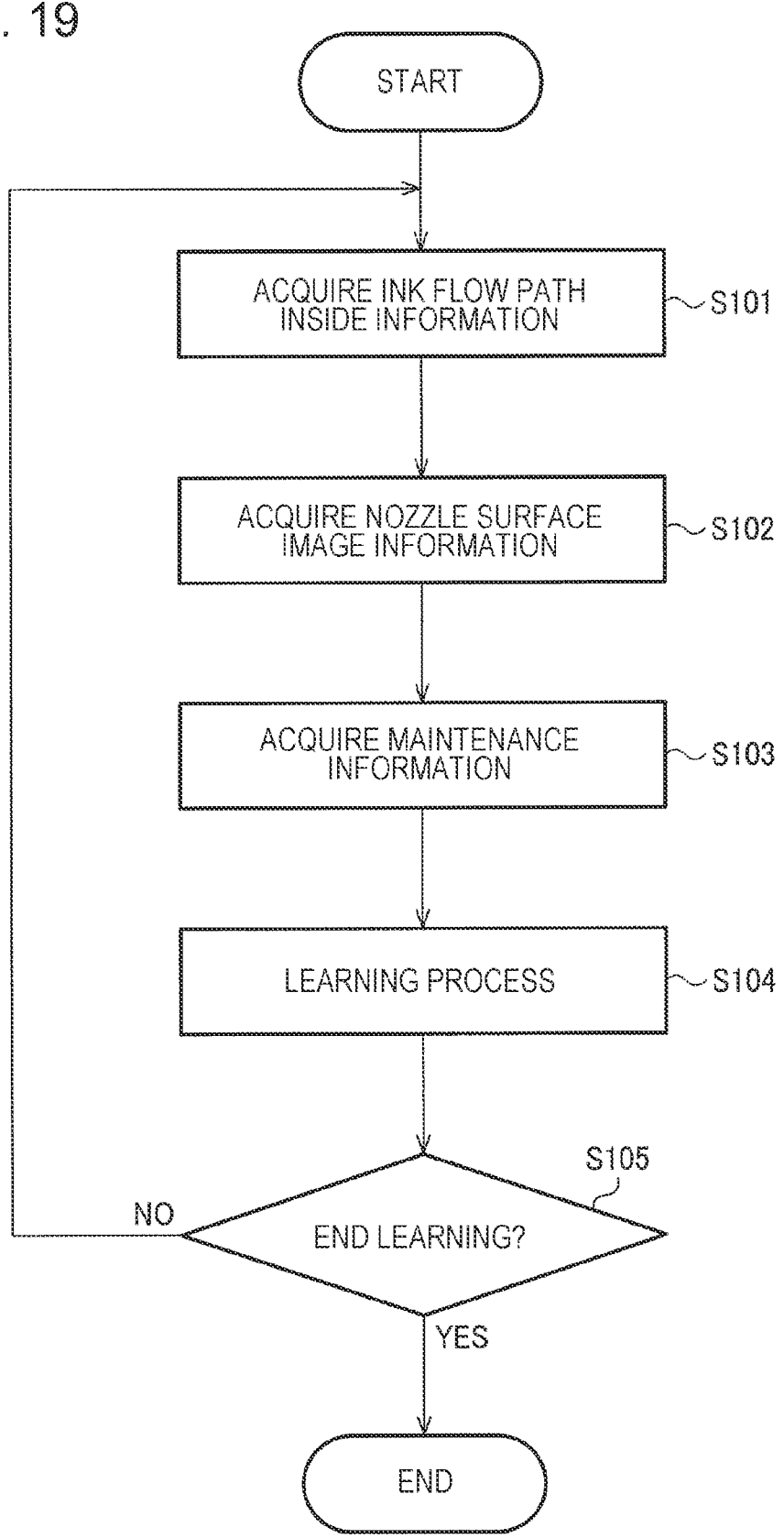
FIG. 19 is a flowchart illustrating the learning process.

FIG. 19 is a flowchart illustrating the learning process based on the training data. When the process is started, in step S101 to step S103, the acquisition portion 410 of the learning device 400 acquires one data set in which the ink flow path inside information, the nozzle surface image information, and the maintenance information are associated with each other.

In step S104, the learning portion 420 executes a specific learning process. The learning portion 420 inputs the ink flow path inside information and the nozzle surface image information to the neural network, and obtains an output by performing a forward calculation using the weighting coefficient information at that time. The output is, for example, N numerical data whose total is 1 as described above. The learning portion 420 obtains an error function based on the output and the maintenance information. The error function is, for example, a sum of absolute difference values between N numerical values that are the outputs and N numerical values that are the maintenance information. However, a method for calculating the error function is not limited thereto, and various modifications can be performed. Further, in step S104, the learning portion 420 updates the weighting coefficient information so as to reduce the error function. In the process, the backpropagation method can be applied as described above.

Step S101 to step S104 are processes based on one data set. In step S105, the learning portion 420 determines whether or not to end the learning process. For example, the learning portion 420 ends the learning process when the process is performed based on a predetermined number or more of data sets or when a correct answer rate based on verification data is a predetermined value or more. The verification data is a part of the data set collected for machine learning and represents a data set that is not used for a weighting coefficient information updating process. Since the verification data is the data associated with the maintenance information which is the correct answer data, the verification data can be used to verify whether or not the inference by the neural network is correct.

In a case of Yes in step S105, the learning portion 420 ends the learning process. The learning device 400 outputs the learned model, which is a learning result, to the information processing system 200. The information of the learned model is stored in the storage portion 230. In a case of No in step S105, the learning portion 420 returns to step S101 and continues the process. Specifically, the acquisition portion 410 reads next data set, and the learning portion 420 updates the weighting coefficient information using the data set. FIG. 19 is an example of a flow of the learning process, and a specific process is not limited thereto. For example, methods, such as batch learning and mini-batch learning, are known in the machine learning, and the methods can be widely applied in the present embodiment. In addition, the learning process as described above may be added to a user environment in which the printing device 1 is used. An additional learning process may be learned by comparing states before and after executing the maintenance sequence based on the maintenance information output by the inference process to detect whether or not the discharge defect is eliminated when the printing device 1 is operated in the user environment, and the learned model may be improved. Further, the learned model generated by the added learning in the user environment may be installed in the printing device 1 newly installed in the user environment. In particular, when the learned model of the printing device 1 that is originally used is installed in a case where a new printing device 1 of the same model is installed, it is possible to obtain an appropriate inference result using the learned model, which is improved by the added learning based on the user environment, from a time of installation.

6. Inference Process

Figure 20:
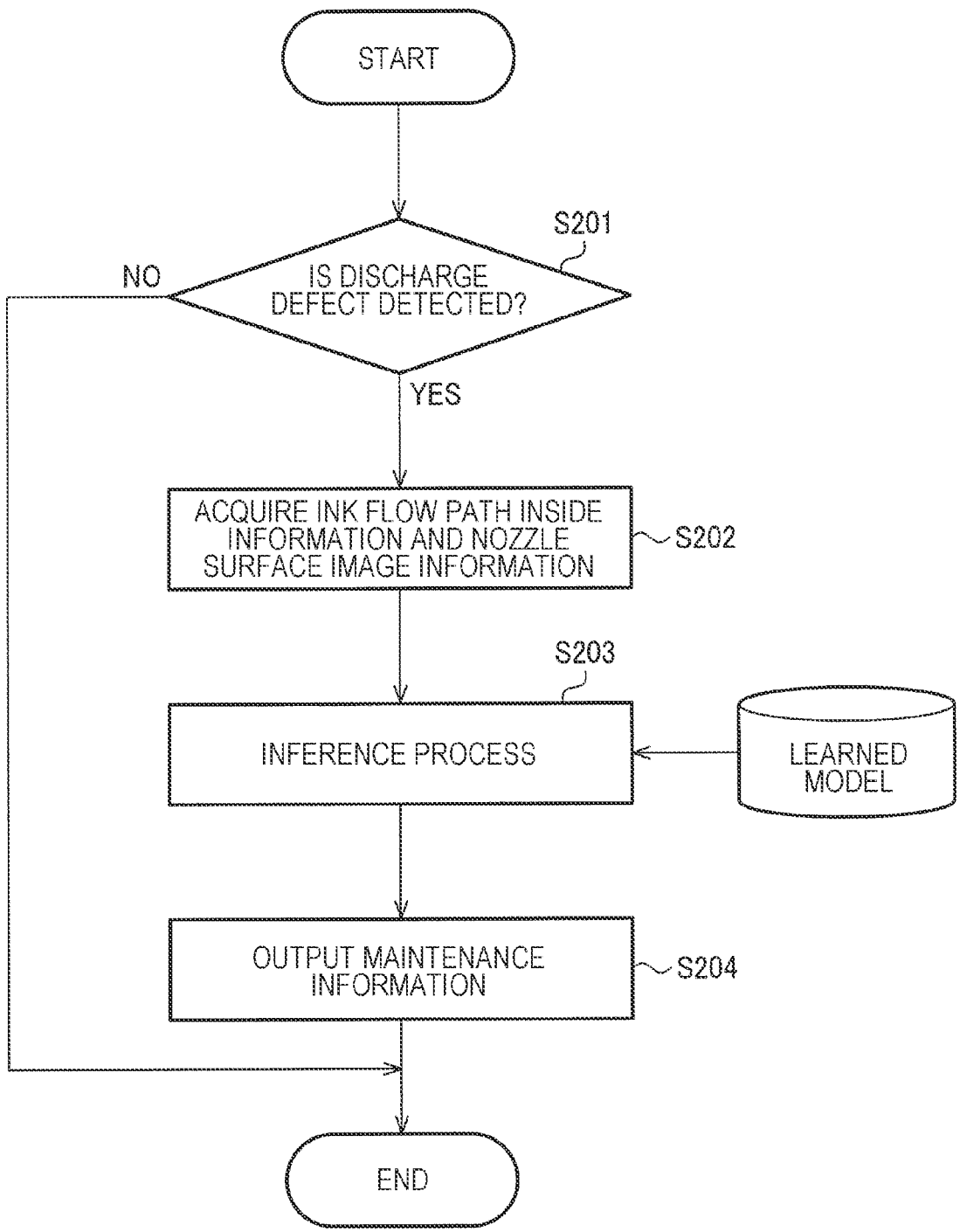
FIG. 20 is a flowchart illustrating a process of determining a maintenance sequence.

FIG. 20 is a flowchart illustrating the inference process executed in the information processing system 200. The process shown in FIG. 20 may be executed at a predetermined timing such as the start of printing and the end of printing in the printing device 1. When the printing is executed at the start of printing, it is possible to suppress inappropriate printing in a state where the discharge defect occurs. In addition, the printing operation tends to change the states of the ink flow path, the nozzle hole, and the nozzle plate surface. Therefore, when the process of FIG. 20 is performed at the end of printing, it is possible to promptly eliminate the discharge defect when the discharge defect occurs. In addition, the process shown in FIG. 20 may be executed periodically regardless of the state of the printing device 1.

When the process is started, first, in step S201, the processing portion 220 determines whether or not the discharge defect occurs. For example, the acquisition portion 210 acquires discharge result information including the amount of deviation of an ink discharge position. The ink discharge position represents, for example, a position when the ink droplet discharged from the nozzle Nz lands on the print medium. The processing portion 220 detects the discharge defect of the print head 30 based on the discharge result information, and outputs the maintenance information when the discharge defect is detected. In this way, it is possible to appropriately detect that the discharge defect, such as a flight bending, occurs, and to select the appropriate maintenance sequence in consideration of the factor of the discharge defect.

Here, the discharge result information is information acquired, for example, by imaging the print medium using the imaging portion included in the printing device 1. In the example shown in FIG. 2, the imaging portion here is the first imaging portion 71 included in the first imaging unit 70. In this way, it is possible to automatically detect the occurrence of the discharge defect. For example, the printing device 1 prints a given test pattern. The processing portion 220 can determine whether or not the ink droplets land at a desired position by comparing test pattern information with the discharge result information which is an actual printing result.

A comparison process between the test pattern information and an image obtained by imaging the print medium may be performed by an external device of the information processing system 200. For example, the first image processing portion 72 or the processor 102 of the printing device 1 may perform the comparison process. In this case, the discharge result information may be numerical information representing the amount of deviation, or may be information representing whether or not the amount of deviation is equal to or greater than a predetermined threshold value. Further, the processing portion 220 may detect the discharge defect based on a user input by the user who visually observes the printing result.

As described above with reference to FIG. 6, the first imaging portion 71, which is the imaging portion here, may be attached to the carriage 21 on which the print head 30 is mounted. In this way, it is possible to vary a relative positional relationship between the first imaging portion 71 and the print medium in accordance with the movement of the carriage 21. Therefore, for example, even when an angle of view of the first imaging portion 71 is narrow, it is possible to image a wide range of the print medium by a plurality of times of imaging.

In addition, the process in step S201 is not limited to the above. For example, the processing portion 220 may detect the discharge defect of the print head 30 based on the waveform information of the residual vibration, and may output the maintenance information when the discharge defect is detected. As described above with reference to FIG. 7 to FIG. 10, it is possible to detect the air bubble or the thickening inside the ink flow path based on the waveform information. Since the discharge defect is determined when the air bubble or the thickening occurs, it is possible to detect the discharge defect by using the waveform information. Further, the processing portion 220 may detect the discharge defect by using both the discharge result information and the waveform information.

When it is determined that the discharge defect does not occur (No in step S201), the processing portion 220 ends the process without outputting the maintenance information. That is, the information processing system 200 does not instruct the printing device 1 to execute maintenance.

When it is determined that the discharge defect occurs (Yes in step S201), in step S202, the acquisition portion 210 acquires the ink flow path inside information and the nozzle surface image information. Specifically, the acquisition portion 210 acquires the waveform information which is the output of the inspection unit 80 and the image information which is the output of the second imaging unit 75.

In step S203, the processing portion 220 performs a process of determining the maintenance sequence based on the learned model generated by the learning device 400 and the ink flow path inside information and the nozzle surface image information acquired in step S202. Specifically, the processing portion 220 inputs the ink flow path inside information and the nozzle surface image information to the learned model read from the storage portion 230, and obtains N numerical data by performing the forward calculation. As shown in FIG. 18, the N numerical data represents, for example, a probability of recommending each of the first to N-th maintenance sequences. The processing portion 220 selects any one of the first to N-th maintenance sequences by specifying data having the largest value in the N numerical data.

The processing portion 220 may perform a process of specifying the defective nozzle at which the discharge defect is detected, and may output the maintenance information based on the data of an area including the defective nozzle in the nozzle surface image information. For example, when the test pattern is used, a position is known where the ink droplets from the nozzle Nz land, so that it is possible to measure the amount of deviation of the landing position for each nozzle Nz. In addition, since the waveform information can be acquired for each piezo element PZT, it is possible to specify whether or not the air bubble or the thickening is generated in the ink flow path corresponding to any nozzle Nz in this case. It is possible to perform a process to be limited to only a part, at which the discharge defect occurs, of the nozzle surface image information, so that it is possible to reduce processing loads and improve processing accuracy. However, it is not hindered that the entire nozzle surface image information is used for the process in step S203.

In step S204, the processing portion 220 outputs the maintenance information. For example, the processing portion 220 instructs the printing device 1 to execute the selected maintenance sequence. The printing device 1 executes the maintenance sequence selected by the information processing system 200.

The calculation in the processing portion 220 according to the learned model in step S203, that is, the calculation for outputting the output data based on the input data may be executed by software or may be executed by hardware. In other words, the product sum calculation executed at each node of FIG. 17, the filtering process executed at the convolution layer of the CNN, and the like may be executed by software. Alternatively, the calculation may be executed by a circuit device such as FPGA. In addition, the calculation may be executed by a combination of software and hardware. In this way, the operation of the processing portion 220 according to a command from the learned model can be realized by various aspects. For example, the learned model includes an inference algorithm and a weighting coefficient used in the inference algorithm. The inference algorithm is an algorithm for performing a filtering calculation or the like based on the input data. In this case, both the inference algorithm and the weighting coefficient are stored in the storage portion 230, and the processing portion 220 may perform the inference process by software by reading the inference algorithm and the weighting coefficient. Alternatively, the inference algorithm may be realized by FPGA or the like, and the storage portion 230 may store the weighting coefficient. Alternatively, the inference algorithm including the weighting coefficient may be realized by FPGA or the like. In this case, the storage portion 230 that stores the information of the learned model is, for example, a built-in memory of FPGA.

7. Modification Example

Hereinabove, an example is described in which the learned model is generated based on the data set in which the ink flow path inside information, the nozzle surface image information, and the maintenance information are associated with each other. The processing portion 220 outputs the maintenance information based on the learned model, the ink flow path inside information, and the nozzle surface image information. However, the data set may include further information.

For example, the learned model of the present embodiment may be machine-learned based on the data set in which the ink flow path inside information, the nozzle surface image information, and the maintenance information are associated with each other, and maintenance history information representing history of maintenance performed on the print head 30.

Here, the maintenance history information is information which specifies one or more maintenance sequences executed in the past. In addition, the maintenance history information may include information such as an execution timing and the number of executions of the maintenance sequence in the past. For example, even when the refreshing operation is performed as the latest maintenance sequence, it is considered that the characteristics related to the discharge defect are different between the printing device 1 in which the refreshing operation is performed many times before the refreshing operation and the printing device 1 in which the refreshing operation is not performed so much. For example, according to the configuration of the printing device 1 itself, the environment in which the printing device 1 is installed, and the like, a factor that is likely to cause the discharge defect and a factor that is unlikely to cause the discharge defect are different. When the maintenance history information is used, it is possible to perform a process in consideration of usage history of the printing device 1, so that it is possible to improve an estimation accuracy.

For example, the learning device 400 generates the learned model by performing machine learning using the ink flow path inside information, the nozzle surface image information, and the maintenance history information as input data and using the maintenance information as the correct answer data. The processing portion 220 outputs the maintenance information by acquiring the ink flow path inside information, the nozzle surface image information, and the maintenance history information of the target printing device 1 and inputting the pieces of information to the learned model.

In addition, in the method of the present embodiment, usage environment information of the printing device 1 may be used for a process. The usage environment information includes dust information, temperature information, humidity information, print medium information, and print condition information of the printing device 1.

The dust information is acquired by, for example, the dust sensor 93 such as the particle counter. The temperature information is acquired by the temperature sensor 91. The humidity information is acquired by the humidity sensor 92. The temperature information and the humidity information may be acquired based on the temperature sensor and the humidity sensor provided on the outside of the printing device 1. For example, an environmental temperature and an environmental humidity of a room in which the printing device 1 is installed may be used as the temperature information and the humidity information. The print medium information is information which specifies a type of the print medium, and may be information which represents paper or cloth, or may be more detailed information such as plain paper or photographic paper. The print medium information is input by, for example, the user. The print condition information is, for example, a print duty. The print duty is information indicating, for example, a printing frequency, and represents, for example, the number of times that ink droplets are discharged from the nozzle Nz when printing is performed in a predetermined unit such as one page. For example, in solid printing in which a whole paper surface is a printing target, the print duty becomes high.

The dust information is related to a tendency for the foreign matter on the nozzle hole and nozzle plate surface to occur. The temperature information and the humidity information are related to a tendency for the thickening and the liquid droplet to occur. The print medium information is related to a tendency for the foreign matter, such as the fluff and the paper dust, to occur. The print condition information is related to a tendency for the liquid droplet to occur due to the mist. That is, the pieces of printing environment information are related to the factor of the discharge defect.

Therefore, when the pieces of information are used for the process, it is possible to select a more appropriate maintenance sequence.

For example, the learning device 400 generates the learned model by performing machine learning using the ink flow path inside information, the nozzle surface image information, and the usage environment information as the input data and using the maintenance information as the correct answer data. The processing portion 220 outputs the maintenance information by acquiring the ink flow path inside information, the nozzle surface image information, and the usage environment information of the target printing device 1, and inputting the pieces of information to the learned model.

In addition, feedback may be provided by observing the result in which the maintenance sequence output by the information processing system 200 is executed in the printing device 1. For example, after executing the maintenance sequence, the printing device 1 collects at least one of the improvement state information of the factor of the discharge defect and the print stability information as the same as in the learning stage described above. The learning device 400 determines whether or not the executed maintenance sequence is appropriate based on at least one of the improvement state information and the print stability information, and updates the learned model based on the determination result. Specifically, as in the example described above, the learning device 400 performs the updating process of causing the maintenance sequence to be easily selected when the maintenance sequence is appropriate, and performs the updating process of causing the maintenance sequence to be difficultly selected when the maintenance sequence is not appropriate.

A learned model updating process may be performed for each printing device 1. For example, the learning device 400 may perform a separate updating process for each printing device 1. Alternatively, the printing device 1 may include the learning device 400. As described above, the characteristic related to the factor of the discharge defect differs depending on the configuration and usage environment of the printing device 1. When the updating process is performed for each printing device 1, it is possible to generate a learned model specialized for the target printing device 1.

As described above, an information processing system of the present embodiment includes a storage portion that stores a learned model; an acquisition portion that acquires ink flow path inside information and nozzle surface image information; and a processing portion that outputs maintenance information based on the acquired ink flow path inside information, the nozzle surface image information, and the learned model. The learned model is a model obtained by performing machine learning on a maintenance condition for the print head based on a data set in which the ink flow path inside information indicating a state of an ink flow path of the print head, the nozzle surface image information obtained by photographing a nozzle plate surface of the print head, and the maintenance information of the print head are associated with each other.

According to a method of the present embodiment, the maintenance information of the print head is output based on the ink flow path inside information and the nozzle surface image information. Since information related to a factor of the discharge defect is used, it is possible to select appropriate maintenance according to the factor. As a result, it is possible to suppress the amount of ink consumed by maintenance and the time required for maintenance.

In addition, in the present embodiment, the processing portion may detect a discharge defect of the print head based on discharge result information including an amount of deviation of an ink discharge position, and may output the maintenance information when the discharge defect is detected.

In this way, it is possible to detect the discharge defect based on the discharge result information, and it is possible to output the maintenance information according to the factor of the discharge defect when the discharge defect is detected.

In addition, in the present embodiment, the discharge result information may be information by imaging a print medium using an imaging portion provided in a printing device.

In this way, it is possible to acquire image information obtained by imaging the print medium as the discharge result information.

Further, in the present embodiment, the imaging portion may be attached to a carriage on which the print head is mounted.

In this way, it is possible to efficiently image the print medium by the imaging portion.

In addition, in the present embodiment, the print head may be a piezo head that discharges ink by applying a voltage to a piezoelectric element, and the ink flow path inside information may include waveform information of residual vibration when the voltage is applied.

In this way, when the waveform information of the residual vibration is used as the ink flow path inside information, it is possible to output the maintenance information according to the state of the ink flow path.

In addition, in the present embodiment, the processing portion may detect the discharge defect of the print head based on the waveform information, and may output the maintenance information when the discharge defect is detected.

In this way, it is possible to detect the discharge defect based on the waveform information of the residual vibration, and it is possible to output the maintenance information according to the factor of the discharge defect when the discharge defect is detected.

Further, in the present embodiment, the processing portion may perform a process of specifying a defective nozzle at which the discharge defect is detected, and may output the maintenance information based on data of an area including the defective nozzle in the nozzle surface image information.

In this way, since it is possible to use a part, which is related to the discharge defect, of the nozzle surface image information as a processing target, so that it is possible to reduce processing loads and improve processing accuracy.

In addition, in the present embodiment, the maintenance information may be information which specifies a maintenance sequence that includes at least one maintenance operation of a refreshing operation of the ink flow path, a wiping operation of the nozzle plate surface, a minute vibration operation of diffusing ink thickening, a minute suction operation of the ink from a nozzle, and a flushing operation.

In this way, it is possible to cause the printing device to execute maintenance in which any one or two or more of various maintenance operations are combined.

In addition, in the present embodiment, the nozzle surface image information may be information which can specify at least one of foreign matter information on the nozzle plate surface, liquid droplet information on the nozzle plate surface, and foreign matter information on a nozzle hole formed on the nozzle plate surface.

In this way, it is possible to output the maintenance information according to the factor of the discharge defect on the nozzle plate surface or the nozzle hole.

Further, in the present embodiment, the learned model may be machine-learned based on a data set in which the ink flow path inside information, the nozzle surface image information, the maintenance information, and maintenance history information representing a history of maintenance performed on the print head are associated with each other.

In this way, when a maintenance history in the past is used for the process, it is possible to output more appropriate maintenance information.

Further, a learning device of the present embodiment includes an acquisition portion and a learning portion. The acquisition portion acquires a data set in which ink flow path inside information indicating a state of an ink flow path of a print head, nozzle surface image information obtained by photographing a nozzle plate surface of the print head, and maintenance information of the print head are associated with each other. The learning portion generates a learned model by performing machine learning on a maintenance condition for the print head based on the data set.

In addition, an information processing method of the present embodiment includes acquiring a learned model obtained by performing machine learning on a maintenance condition for a print head based on a data set in which ink flow path inside information indicating a state of an ink flow path of the print head, nozzle surface image information obtained by photographing a nozzle plate surface of the print head, and maintenance information of the print head are associated with each other; acquiring the ink flow path inside information and the nozzle surface image information; and outputting the maintenance information based on the acquired ink flow path inside information, the acquired nozzle surface image information, and the learned model.

Although the present embodiment is described in detail as described above, those skilled in the art can easily understand that many modifications that do not substantially deviate from new matters and effects of the present embodiment are possible. Therefore, all such modification examples are included in the scope of the present disclosure. For example, a term, which is described at least once in a specification or a drawing together with a different term in a broader or synonymous manner, can be replaced by the different term anywhere in the specification or the drawing. All combinations of the present embodiment and modification examples are also included in the scope of the present disclosure. Further, the configuration and the operation of the information processing system, the printing device, and the like are not limited to those described in the present embodiment, and various modifications can be performed.

What is claimed is:

1. An information processing system comprising:
    a storage portion that stores a learned model obtained by performing machine learning on a maintenance condition for a print head based on a data set in which ink flow path inside information indicating a state of an ink flow path of the print head, nozzle surface image information obtained by photographing a nozzle plate surface of the print head, and maintenance information of the print head are associated with each other;
    an acquisition portion that acquires the ink flow path inside information and the nozzle surface image information; and
    a processing portion that outputs the maintenance information based on the acquired ink flow path inside information, the acquired nozzle surface image information, and the learned model.

2. The information processing system according to claim 1, wherein
    the processing portion detects a discharge defect of the print head based on discharge result information including an amount of deviation of an ink discharge position, and outputs the maintenance information when the discharge defect is detected.

3. The information processing system according to claim 2, wherein
    the discharge result information is information acquired by imaging a print medium using an imaging portion provided in a printing device.

4. The information processing system according to claim 3, wherein
    the imaging portion is attached to a carriage on which the print head is mounted.

5. The information processing system according to claim 2, wherein
    the processing portion performs a process of specifying a defective nozzle at which the discharge defect is detected, and
    outputs the maintenance information based on data of an area including the defective nozzle in the nozzle surface image information.

6. The information processing system according to claim 1, wherein
    the print head is a piezo head that discharges ink by applying a voltage to a piezoelectric element, and
    the ink flow path inside information includes waveform information of residual vibration when the voltage is applied.

7. The information processing system according to claim 6, wherein
    the processing portion detects a discharge defect of the print head based on the waveform information, and outputs the maintenance information when the discharge defect is detected.

8. The information processing system according to claim 1, wherein
    the maintenance information is information which specifies a maintenance sequence that includes at least one maintenance operation of a refreshing operation of the ink flow path, a wiping operation of the nozzle plate surface, a minute vibration operation of diffusing ink thickening, a minute suction operation of the ink from a nozzle, and a flushing operation.

9. The information processing system according to claim 1, wherein
    the nozzle surface image information is information which can specify at least one of foreign matter information on the nozzle plate surface, liquid droplet information on the nozzle plate surface, and foreign matter information on a nozzle hole formed on the nozzle plate surface.

10. The information processing system according to claim 1, wherein
    the learned model is machine-learned based on a data set in which the ink flow path inside information, the nozzle surface image information, the maintenance information, and maintenance history information representing a history of maintenance performed on the print head are associated with each other.

11. A learning device comprising:

an acquisition portion that acquires a data set in which ink flow path inside information indicating a state of an ink flow path of a print head, nozzle surface image information obtained by photographing a nozzle plate surface of the print head, and maintenance information of the print head are associated with each other; and a learning portion that generates a learned model by performing machine learning on a maintenance condition for the print head based on the data set.

12. An information processing method comprising:

acquiring a learned model obtained by performing machine learning on a maintenance condition for a print head based on a data set in which ink flow path inside information indicating a state of an ink flow path of the print head, nozzle surface image information obtained by photographing a nozzle plate surface of the print head, and maintenance information of the print head are associated with each other;

acquiring the ink flow path inside information and the nozzle surface image information; and outputting the maintenance information based on the acquired ink flow path inside information, the acquired nozzle surface image information, and the learned model.

* * * * *